United States Patent
Gross, IV et al.

(10) Patent No.: US 9,350,657 B2
(45) Date of Patent: May 24, 2016

(54) ENCAPSULATING DATA PACKETS USING AN ADAPTIVE TUNNELLING PROTOCOL

(71) Applicant: Nicira, Inc., Palo Alto, CA (US)

(72) Inventors: Jesse E. Gross, IV, San Francisco, CA (US); Teemu Koponen, San Francisco, CA (US); W. Andrew Lambeth, San Mateo, CA (US)

(73) Assignee: NICIRA, INC., Palo Alto, CA (US)

( * ) Notice: Subject to any disclaimer, the term of this patent is extended or adjusted under 35 U.S.C. 154(b) by 86 days.

(21) Appl. No.: 14/069,309

(22) Filed: Oct. 31, 2013

(65) Prior Publication Data

US 2015/0009995 A1    Jan. 8, 2015

Related U.S. Application Data

(60) Provisional application No. 61/843,853, filed on Jul. 8, 2013.

(51) Int. Cl.
*H04L 12/741* (2013.01)
*H04L 29/06* (2006.01)
*H04L 29/08* (2006.01)
*H04L 12/46* (2006.01)

(52) U.S. Cl.
CPC .......... *H04L 45/74* (2013.01); *H04L 12/4633* (2013.01); *H04L 69/22* (2013.01); *H04L 69/324* (2013.01); *H04L 12/4641* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 5,550,816 A | 8/1996 | Hardwick et al. | |
| 6,111,876 A * | 8/2000 | Frantz et al. | 370/392 |
| 6,219,699 B1 | 4/2001 | McCloghrie et al. | |
| 6,512,745 B1 | 1/2003 | Abe et al. | |
| 6,963,585 B1 | 11/2005 | Le Pennec et al. | |
| 7,013,342 B2 | 3/2006 | Riddle | |
| 7,046,630 B2 | 5/2006 | Abe et al. | |
| 7,379,465 B2 | 5/2008 | Aysan et al. | |
| 7,606,229 B1 | 10/2009 | Foschiano et al. | |

(Continued)

FOREIGN PATENT DOCUMENTS

| | | |
|---|---|---|
| WO | WO 2010/041996 | 4/2010 |
| WO | PCT/US2014/036272 | 4/2014 |
| WO | WO 2015/005967 | 1/2015 |

OTHER PUBLICATIONS

International Search Report and Written Opinion for PCT/US2014/036272, Aug. 12, 2004 (mailing date), Nicira, Inc.

(Continued)

*Primary Examiner* — Christine Duong
(74) *Attorney, Agent, or Firm* — Adeli LLP

(57) ABSTRACT

Some embodiments of the invention provide a novel method of tunneling data packets. The method establishes a tunnel between a first forwarding element and a second forwarding element. For each data packet directed to the second forwarding element from the first forwarding element, the method encapsulates the data packet with a header that includes a tunnel option. The method then sends the data packet from the first forwarding element to the second forwarding element through the established tunnel. In some embodiments, the data packet is encapsulated using a protocol that is adapted to change with different control plane implementations and the implementations' varying needs for metadata.

15 Claims, 15 Drawing Sheets

(56) References Cited

U.S. PATENT DOCUMENTS

| | | | |
|---|---|---|---|
| 7,606,260 | B2 | 10/2009 | Oguchi et al. |
| 7,643,488 | B2 | 1/2010 | Khanna et al. |
| 7,792,987 | B1 | 9/2010 | Vohra et al. |
| 7,826,482 | B1 | 11/2010 | Minei et al. |
| 7,937,438 | B1 | 5/2011 | Miller et al. |
| 7,974,202 | B2 | 7/2011 | Solomon |
| 8,031,633 | B2 | 10/2011 | Bueno et al. |
| 8,055,789 | B2 | 11/2011 | Richardson et al. |
| 8,146,148 | B2 | 3/2012 | Cheriton |
| 8,160,069 | B2 | 4/2012 | Jacobson et al. |
| 8,224,971 | B1 | 7/2012 | Miller et al. |
| 8,259,571 | B1 | 9/2012 | Raphel et al. |
| 8,312,129 | B1 | 11/2012 | Miller et al. |
| 8,351,418 | B2 | 1/2013 | Zhao et al. |
| 8,611,352 | B2 | 12/2013 | Mizrahi et al. |
| 8,625,616 | B2 | 1/2014 | Vobbilisetty et al. |
| 8,644,188 | B1 | 2/2014 | Brandwine et al. |
| 8,825,900 | B1 | 9/2014 | Gross, IV et al. |
| 2004/0097232 | A1 | 5/2004 | Haverinen |
| 2005/0053079 | A1 | 3/2005 | Havala |
| 2006/0002370 | A1 | 1/2006 | Rabie et al. |
| 2006/0026225 | A1 | 2/2006 | Canali et al. |
| 2006/0193266 | A1 | 8/2006 | Siddha et al. |
| 2006/0245438 | A1* | 11/2006 | Sajassi et al. .................. 370/399 |
| 2007/0098006 | A1 | 5/2007 | Parry et al. |
| 2007/0130366 | A1 | 6/2007 | O'Connell et al. |
| 2007/0280243 | A1 | 12/2007 | Wray et al. |
| 2007/0286137 | A1 | 12/2007 | Narasimhan et al. |
| 2008/0031263 | A1 | 2/2008 | Ervin et al. |
| 2008/0198858 | A1 | 8/2008 | Townsley et al. |
| 2008/0285452 | A1 | 11/2008 | Oran |
| 2008/0285463 | A1 | 11/2008 | Oran |
| 2008/0291910 | A1 | 11/2008 | Tadimeti et al. |
| 2009/0141729 | A1 | 6/2009 | Fan |
| 2010/0098092 | A1 | 4/2010 | Luo et al. |
| 2010/0254385 | A1 | 10/2010 | Sharma et al. |
| 2011/0261812 | A1 | 10/2011 | Kini et al. |
| 2012/0131643 | A1 | 5/2012 | Cheriton |
| 2012/0271928 | A1* | 10/2012 | Kern et al. ..................... 709/220 |
| 2013/0044751 | A1* | 2/2013 | Casado et al. ................ 370/392 |

OTHER PUBLICATIONS

Davie, Bruce, et al., "A Stateless Transport Tunneling Protocol for Network Virtualization," Mar. 12, 2013, pp. 1-19, VMware, Inc., Palo Alto, CA, USA.

Mahalingam, Mallik., et al., "VXLAN: A Framework for Overlaying Virtualized Layer 2 Networks over Layer 3 Networks," May 8, 2013, pp. 1-22, Network Working Group.

Sridharan, Murari, et al., "NVGRE: Network Virtualization using Generic Routing Encapsulation," Feb. 25, 2013, pp. 1-17, Network Working Group.

Davie. B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

Farinacci, D., et al., "Generic Routing Encapsulation (GRE)," Mar. 2000, pp. 1-9, The Internet Society (RFC 2784).

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Mahalingam, M. et al., "XVLAN: A Framework for Overlaying Virtualized Layer 2 Networks over Layer 3 Networks; draft-mahalingam-dutt-dcops-vxlan-00.txt," Aug. 26, 2011, pp. 1-20.

Pfaff, B., et al., "The Open vSwitch Database Management Protocol," Aug. 20, 2012, 34 pages, Nicira. Inc. available at http://tools.ietf.org/html/draft-pfaff-ovsdb-proto-00.

* cited by examiner

ENCAPSULATING DATA PACKETS USING AN ADAPTIVE TUNNELLING PROTOCOL

CLAIM OF BENEFIT TO PRIOR APPLICATION

This application claims the benefit of U.S. Provisional Application 61/843,853, entitled "Propagating Rich Logical Context that Includes Analysis or Extrapolated Data", filed Jul. 8, 2013. U.S. Provisional Application 61/843,853 is incorporated herein by reference.

BACKGROUND

Networking has long featured a variety of tunneling, tagging, and other encapsulation mechanisms. However, the advent of network virtualization has caused a surge of renewed interest and a corresponding increase in the introduction of new protocols. There are a large number of protocols in this space, including Virtual Local Area Networks (VLANs), Multiprotocol Label Switching (MPLS), and Virtual Extensible LAN (VXLAN).

Some of the newer protocols used for virtualization have at least 24 bits of identifier space as a way to partition between tenants. This is often described as overcoming the limits of 12-bit VLANs, and when seen in that context, or any context where it is a true tenant identifier, 16 million possible entries is a large number. However, the reality is that the metadata is not exclusively used to identify tenants. With changing control plane implementations and advancement, there are new requirements that require encoding other information.

Existing tunnel protocols have each attempted to solve different aspects of these new requirements, only to be quickly rendered out of date by changing control plane implementations and advancements. Furthermore, software and hardware components and controllers all have different advantages and rates of evolution.

BRIEF SUMMARY

Some embodiments of the invention provide a novel method of tunneling data packets. The method establishes a tunnel between a first forwarding element and each of second and third forwarding elements through an interface of a tunnel protocol. For each packet directed to the second forwarding element from the first forwarding element, the method uses the tunnel protocol to add a first logical context tag having a first length to the packet's header, and sends the packet through the tunnel from the first forwarding element to the second forwarding element. For each packet directed to the third forwarding element from the first forwarding element, the method uses the tunnel protocol to add a second logical context tag having a second length to the packet's header, and sends the packet through the tunnel from the first forwarding element to the third forwarding element.

To provide the adaptability, the protocol of some embodiments specifies a variable length header. With the variable length, any number of logical context tags can be embedded in the header. For instance, the protocol can be used to adaptively specify zero or more logical context tags for the packet. This is different from some existing protocols that have a fixed length header to specify one particular logical context tag. Once the data packet is sent, a forwarding element or a middlebox receives the packet and uses one or more of the embedded logical context tags to process the data packet.

As the protocol provides for encapsulation capabilities for the evolving next generation of control plane implementations, it is also referred to herein as Next Generation Encapsulation (NGE). In some embodiments, the protocol specifies each logical context tag in a Type-Length-Value format. The logical context tag of some embodiments includes a context tag header and a variable amount of logical context data. The context tag header or option metadata may include any one or more of the following: (1) a type that indicates the format of the data contained in the logical context tag, (2) a length that specifies the length of the logical context tag, (3) a critical option for dropping the packet if any forwarding element that receives the packet does not recognize the logical context tag, and (4) and a set of control flags for processing the logical context tag.

The tunnel protocol of some embodiments specifies a base header that includes a Virtual Network Identifier (VNI). The VNI is an identifier for a unique element of a virtual network. In some embodiments, the protocol further defines the base header to include at least one of a version number field that identifies a version number of the tunnel protocol, a length field that identifies the length of one or more logical context tags, a critical option field that identifies whether a set of critical options is associated with the one or more logical context tags, and an Operations, Administration, and Management (OAM) frame.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method of tunneling data packets. The method establishes a tunnel between a first forwarding element and a second forwarding element. For each data packet directed to the second forwarding element from the first forwarding element, the method encapsulating the data packet with a header that includes a tunnel option. The method then sends sending the data packet from the first forwarding element to the second forwarding element through the established tunnel. In some embodiments, the data packet is encapsulated using a protocol that is adapted to change with different control plane implementations and the implementations' varying needs for metadata.

Figure 1:
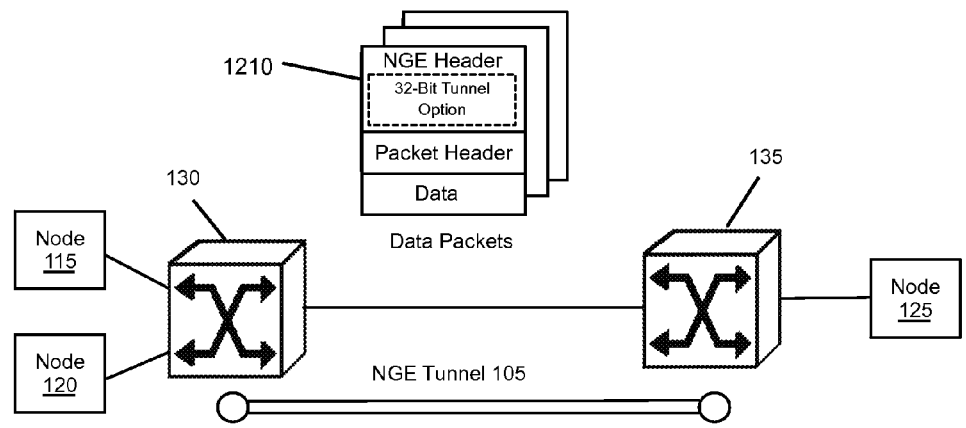
FIG. 1 conceptually illustrates how the Next Generation Encapsulation (NGE) header can be used to specify a tunnel option.
Figure 2:
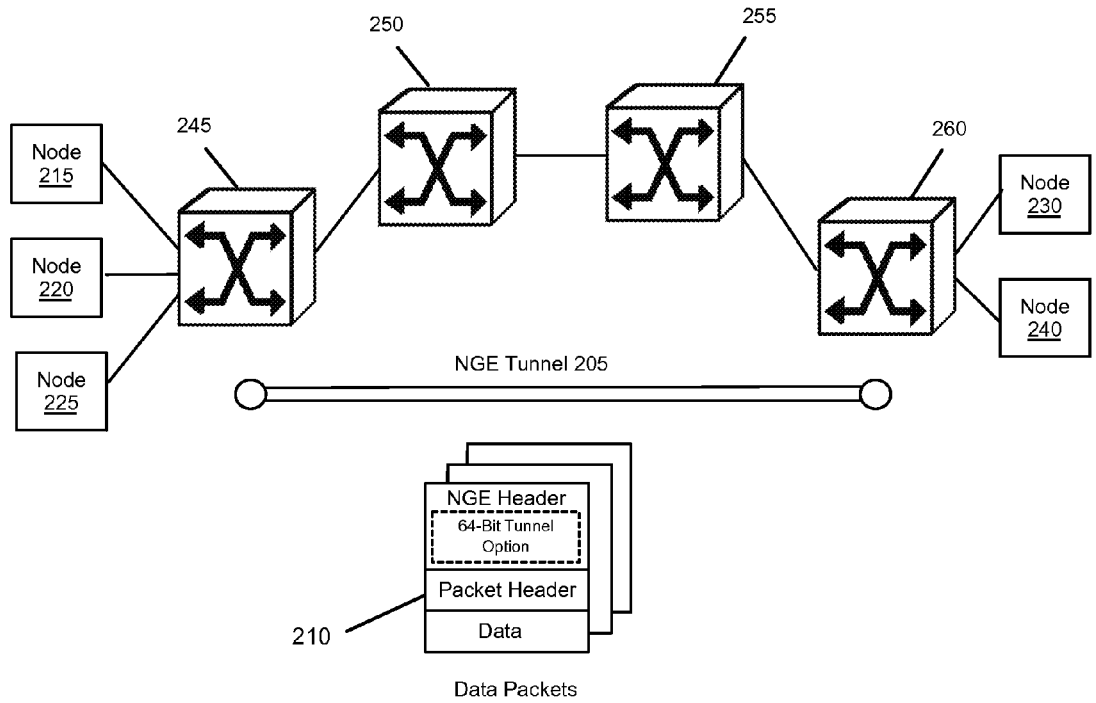
FIG. 2 conceptually illustrates how the format of an NGE header can differ from one tunnel to another.

FIGS. 1 and 2 conceptually illustrate how the NGE's variable length header can be used to adaptively specify different tunnel options for different tunnels. Specifically, FIG. 1 illustrates specifying a 32-bit tunnel options for a NGE tunnel 105. This is followed by FIG. 2 that illustrates specifying a 64-bit tunnel options for a NGE tunnel 205. The figures include forwarding elements (130, 135, 245, 250, 255, and 260) and network nodes (115, 120, 125, 215, 220, 225, 230, and 240). The figure also conceptually illustrates data packets 110 and 210 that are sent over the NGE tunnels 105 and 110, respectively.

The forwarding elements in some embodiments can include virtual or physical network switches, software switches (e.g., Open vSwitch), routers, and/or other switching devices, as well as any other network elements (such as load balancers, etc.) that establish connections between these switches, routers, and/or other switching devices. Such forwarding elements (e.g., physical switches or routers) are also referred as switching elements. In contrast to an off the shelf switch, a software forwarding element is a switching element that in some embodiments is formed by storing its switching table(s) and logic in the memory of a standalone device (e.g., a standalone computer), while in other embodiments, it is a switching element that is formed by storing its switching table(s) and logic in the memory of a device (e.g., a computer) that also executes a hypervisor and one or more virtual machines on top of that hypervisor.

In some embodiments, each network node represents a source or consumer of data. As an example, each network node may communicate with a particular forwarding element to exchange data with another network node. The source prepares the data packet in some cases or the source receives the data packet prepared by another network node. The node may be a virtual machine or a physical machine. The node may be configured in the same physical machine as a corresponding forwarding element.

Each data packet is sent from one data source to one or more other destinations. As shown, each packet includes a packet header and data. The packet header in turn may include a set of headers. The set of headers may include several different protocol headers for different layers of the OSI model. For instance, the packet header may include a header of a transport layer protocol (e.g., a TCP header), a header of a network layer protocol (e.g., an IP header), and/or a header of a data link layer protocol (e.g., an Ethernet header). Different from the header, the data represents user data or the payload.

Each data packet is also encapsulated by a NGE header. The NGE header includes a tunnel option. In some embodiments, a tunnel option includes option metadata and a variable amount of option data. The option metadata data may include any one or more of the following: (1) a type that indicates the format of the data contained in the tunnel option, (2) a length that specifies the length of the option, (3) a critical option for dropping the packet if any forwarding element that receives the packet does not recognize the tunnel option, and (4) and an option control flags.

As shown in FIG. 1, the NGE tunnel 105 is established between two forwarding elements (130 and 135). The NGE tunnel 105 is established so that the nodes 115 and 120 can communicate with 125, and vice versa. They communicate with each other by exchanging data packets 110 through the forwarding elements 130 and 135. As the forwarding elements 130 and 135 are the ultimate consumer of any tunnel metadata, they are also referred to herein as tunnel endpoints.

Each data packet is encapsulated by a NGE header. In the example of FIG. 1, the NGE header includes a 32-bit tunnel option. In some embodiments, the option can be used to embed different types of context data. As an example, the logical context that is stored in the packets can specify rich information about the network ID (the context identifier) and about the logical processing pipeline (e.g., data specifying the stage of the logical processing pipeline). An example of such logical context will be described below by reference to FIGS. 12-14.

In some embodiments, the variable-length option can be used to store a richer logical context that allows earlier managed forwarding elements to store in the logical context data that they extrapolate or that they produce. Subsequent managed forwarding elements can then use this data to process more quickly and efficiently the packets that they receive. For example, a logical switch that receives a packet form a virtual machine (VM), can augment the packet with a user ID so that a subsequent hop (e.g., a firewall) can have this data and use this data to process the packet (e.g., to drop the packet). The next hop can trust this information because it came from the previous logical source, which is trusted. Examples of data that can be stored in the richer context include: authentication information (e.g., username and password), user IDs, user credentials, annotations from middlebox services (upper level protocol info (Session Initiation Protocol (SIP) session, Application gateway type of info, etc.)), specifically injected data (e.g., out of band injected from hypervisor), or any other analysis or extrapolated data.

In some embodiments, the rich logical context data can be categorized into one of several different types. A first type of logical data relates to the physical source of a data packet. An example of such a source is a machine (e.g., a virtual or dedicated machine) that sent the packet or a hypervisor (e.g., on which a software switching element operates) that sent the packet. The rich logical context data relating to the data source can vary from one network implementation to another. As an example, one type of hypervisor (Xen hypervisor or KVM hypervisor) may be more trustworthy than another type. In such cases, a managed forwarding element can mark a packet with rich logical context data that identifies the type of hypervisor, and subsequent managed forwarding elements can choose to forward or drop the packet based on the rich logical context data.

Another type of rich logical context data relates to layer seven (L7) of the Open Systems Interconnection (OSI) model, which is the application layer. In some embodiments, the NGE is used to store rich logical context data that supports various different network services of the application layer. For example, a load balancer may use the context data to somehow distribute network traffic across a number of servers. Another example would be a network service insertion that reads the rich logical context data to enforce security. Yet another example would be using the NGE to store data related L4 processing, such as the state of the congestion. In short, some embodiments use the NGE's adjustable rich logical context data header field to facilitate high level processing that are above and below the L2 and L3 layers of the OSI model.

FIG. 2 illustrates how an NGE tunnel option can differ from one NGE tunnel to another. Specifically, instead of a 32-bit option, the NGE packet 210 is embedded with a 64-bit rich context data or tunnel option. In this example, the tunnel endpoints 245 and 260 may not be the only consumer of tunnel metadata. That is, the forwarding element 250 or 255 may also read the tunnel option to process the data. In some embodiments, a middlebox may process a data packet based on the embedded tunnel options. Examples of such middle boxes includes firewalls, load balancers, network address translators, intrusion detection systems (IDS), wide area network (WAN) optimizers, etc.

Figure 3:
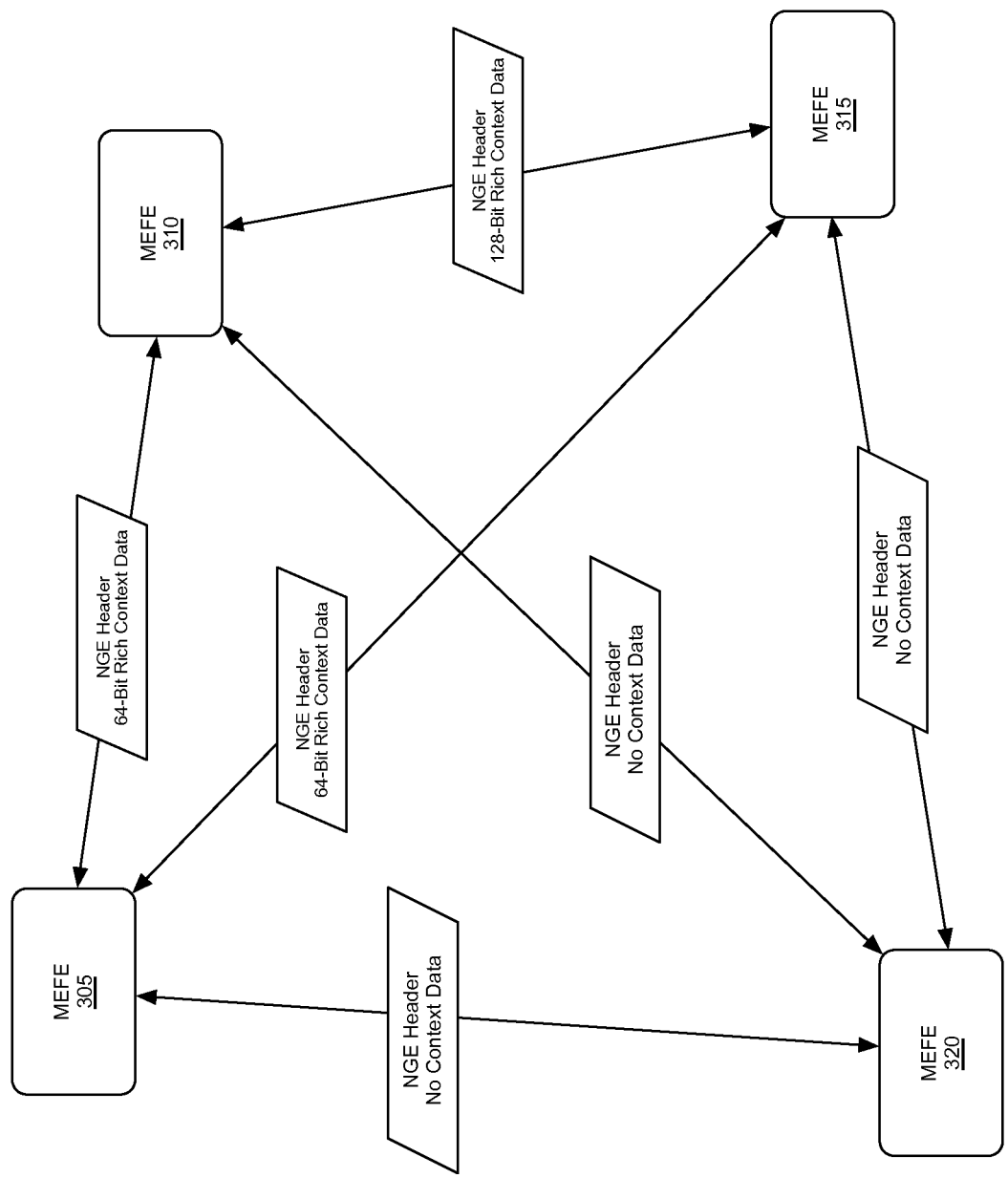
FIG. 3 conceptually illustrates how the NGE's variable length header can be used to flexibly specify different rich logical context tags for different network components.

FIG. 3 conceptually illustrates how the NGE's variable length header can be used to flexibly specify different rich logical context tags for different network components. As shown, the figure includes several managed edge forwarding elements 305-320 of a virtual network. Each managed edge forwarding element can be a hardware switch or a software switch. This figure also shows an arrowed line between each two managed edge forwarding elements. The arrowed lines conceptually represent a tunnel that is established between the two managed edge forwarding elements. Accordingly, the managed edge forwarding elements 305-320 are also referred to herein as tunnel endpoints.

As shown in FIG. 3, the managed edge forwarding elements 305-320 use the variable length header to specify rich logical context data that vary in size or specify no rich context data. Specifically, the managed edge forwarding element 305 encapsulates a packet with 64-bit rich logical context data when forwarding the packet to managed edge forwarding elements 310 and 315. However, the same managed edge forwarding element 305 does not encapsulate a packet with any context data when forwarding the packet to 320.

One reason that the managed edge forwarding element 305 does not encapsulate rich logical context data may be due to the capabilities of the managed edge forwarding element 320. For instance, the managed edge forwarding element 320 may be a hardware or physical switch. The hardware switch has application-specific integrated circuits (ASICs), which are specifically designed to support in-hardware forwarding, but the hardware switch may not be able to process rich logical context data. Different from the hardware switch, a software switch operates on a computing device (e.g., x86 box) that typically does not have such hardware forwarding ASICs. However, the software switch can be configured to read and process a packet header with rich logical info of varying sizes. That is, the software switch endpoint may be configured to handle the variable length aspect, whereas hardware switch endpoint may not support the variable length aspect.

Another reason that the managed edge forwarding element 305 does not perform the encapsulation may be due to performance issues. As an example, in case where performance is critical, the NGE protocol can be used to specify no rich logical context data. In cases where performance is not critical, the NGE protocol can be flexibly used to adjust the header size to have as much rich logical context data as the destination managed edge or non-edge forwarding element needs. In other words, since NGE's header is variable in length, a virtual network is not always paying the high cost of having a large fixed sized header.

In the example of FIG. 3, the managed edge forwarding elements 310 and 315 operate similar to managed edge forwarding element 305. Particularly, the managed edge forwarding element 310 does not encapsulate a packet with rich logical context data when forwarding the packet to the managed edge forwarding element 320 but encapsulates the packet with 64-bit context data when forwarding the packet to managed edge forwarding element 315. Similarly, the managed edge forwarding element 315 does not encapsulate a packet with rich logical context data when forwarding the packet to the managed edge forwarding element 320 but encapsulates the packet with 64-bit context data when forwarding the packet to managed edge forwarding element 310. Also, the managed edge forwarding elements 310 and 315 sends traffics between each other by using 128-bit rich logical context data. Further, the managed edge forwarding element 320 uses no rich context data when forwarding packets to the managed edge forwarding elements 305-315.

Figure 4:
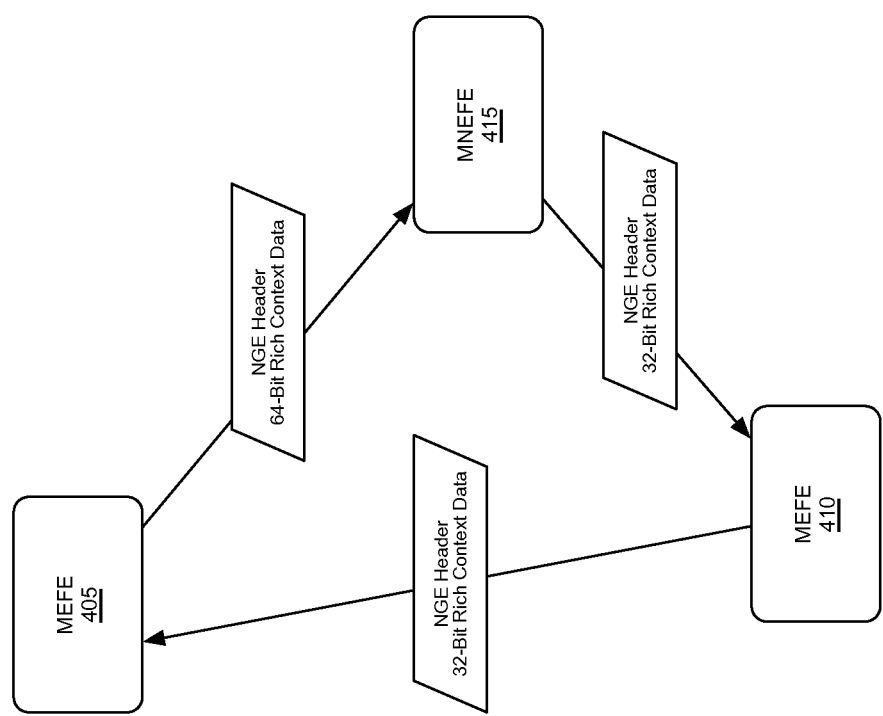
FIG. 4 conceptually illustrates a managed non-edge forwarding element that consumes rich logical context data.

In the example described above, the tunnel endpoints are the consumers of the NGE header data. FIG. 4 conceptually illustrates a managed non-edge forwarding element 415 that consumes the NGE header data. In this example, the non-edge forwarding element 415 can be a hardware switch, a software switch (e.g., that operates on a hypervisor), or an appliance middle box, such as firewalls, load balancers, etc. In some embodiments, the managed non-edge forwarding element 415 is a service node that services a virtual network to provide a multicast overlay. For example, when a forwarding decision results in the need for packet replication, the packet may be tunneled to the service node. The service node then replicates the packet to all managed edge forwarding elements that need a copy of the packet for their local machines.

In the example of FIG. 3, the managed non-edge forwarding element 415 consumes at least some of the 64-bit rich logical context data of a packet from the managed edge forwarding element 405. Specifically, the managed non-edge forwarding element 415 decapsulates the packet and extracts, from the packet's header, a logical context tag. The managed non-edge forwarding element 415 then processes the packet based on the logical context tag. The managed non-edge forwarding element 415 then encapsulates the packet with its own 32-bit rich context data and forwards it to the managed edge forwarding element 415. The example also shows the managed edge forwarding element 410 encapsulating 32-bit rich logical context data when forwarding traffic to the managed edge forwarding element 405.

Several more examples of encapsulating data packets will be described below. However, before describing these examples, several terms are defined in Section I. This is followed by Section II that describes several example design requirements for the NGE. Section III then describes details of NGE encapsulation. Section IV then describes encapsulation of NGE in Internet Protocol (IP). Section V then describes possible interoperability relating to the NGE. This is followed by a description of security considerations in section VI. Section VII describes considerations relating to Internet Assigned Numbers Authority (IANA). Section VIII then describes several example uses for the NGE. Finally, Section IX describes an electronic system with which some embodiments of the invention are implemented.

I. Terminology

The following is a list of some of the terms that are used in this application:

Checksum offload: An optimization implemented by many Network Interface Cards (NICs) which enables computation and verification of upper layer protocol checksums on transmit and receive, respectively. This typically includes IP and Transmission Control Protocol (TCP)/User Datagram Protocol (UDP) checksums, which would otherwise be computed by the protocol stack in software.

Equal Cost Multipath (ECMP): A routing mechanism for selecting from among multiple best next hop paths by hashing packet headers in order to increase bandwidth while avoiding reordering a single stream.

Large Receive Offload (LRO): The receive-side equivalent function of LSO, in which multiple protocol segments (primarily TCP) are coalesced into larger data units.

Large Segmentation Offload (LSO): A function provided by many commercial NICs that allows data units larger than the MTU to be passed to the NIC to improve performance. The NIC being responsible for creating smaller segments with correct protocol headers (such as TCP/IP).

Next Generation Encapsulation (NGE): The tunnel protocol described in this application.

Network Interface Card (NIC)

Non-terminating device: A device capable of understanding the NGE frame format but which does not directly encapsulate or decapsulate packets. A NIC could be a non-terminating device, e.g., encapsulation is handled by software (which is the tunnel endpoint) but the NIC may be able to parse some or all of the header to provide Large Segmentation Offload (LSO) or LRO for increased performance.

Operations, Administration, and Management (OAM): A suite of tools used to monitor and troubleshoot network problems.

Packet: The term "packet" is used here as well as throughout this application to refer to a collection of bits in a particular format sent across a network. In some embodiments, a packet is a unit of data that typically comprises a header and user data. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The innermost header is usually the last header of the headers before the payload of the packet. For the network that implements the protocol of the outer-most header of a packet, the network considers only the outer-most header of the packet as the header and the other headers and the user data of the packet are together considered as the payload of the packet. One of ordinary skill in the art will recognize that the term "packet" may be used herein to refer to various formatted collections of bits that may be sent across a network, such as Ethernet frames, TCP segments, UDP datagrams, IP packets, etc.

Transit device: A forwarding element along the path of the tunnel.

Tunnel endpoint: A component encapsulating Ethernet frames in NGE headers and vice versa. As the ultimate consumer of any tunnel metadata, endpoints have the highest level of requirements for parsing and interpreting tunnel headers. In some embodiments, tunnel endpoints are comprised of either software or hardware implementations or a combination of the two. In the latter case, requirements should be construed as applying to the entire system and not a particular component of the implementation. For example, in a system comprised of a forwarding ASIC and a general purpose CPU a requirement to drop a packet on the basis of an unknown field does not mean that it must be dropped in the ASIC. An implementation may send the packet to the CPU using a rate-limited control channel for slow-path exception handling.

Tunneling: Encapsulating a data packet that includes a header of a first communication protocol with a header of a second communication protocol in order to transmit the data packet over a delivery network that implements the second communication protocol. A tunnel is deemed established when two network nodes of the delivery network are set up to deliver packets from a first of the two network nodes to a second of the two network nodes using the encapsulating protocol. The network nodes of the delivery network may include switches, routers, workstations, servers, virtual machines, or any devices that can transmit and/or receive data packets.

Virtual Machine (VM)

II. Example Design Requirements

In some embodiments, NGE is designed to support network virtualization use cases, where tunnels are typically established to act as a backplane between the virtual switches residing in hypervisors, physical switches, or middleboxes or other appliances. An arbitrary IP network can be used as an underlay although Clos networks composed using ECMP links are a common choice to provide consistent bisectional bandwidth across all connection points.

Figure 5:
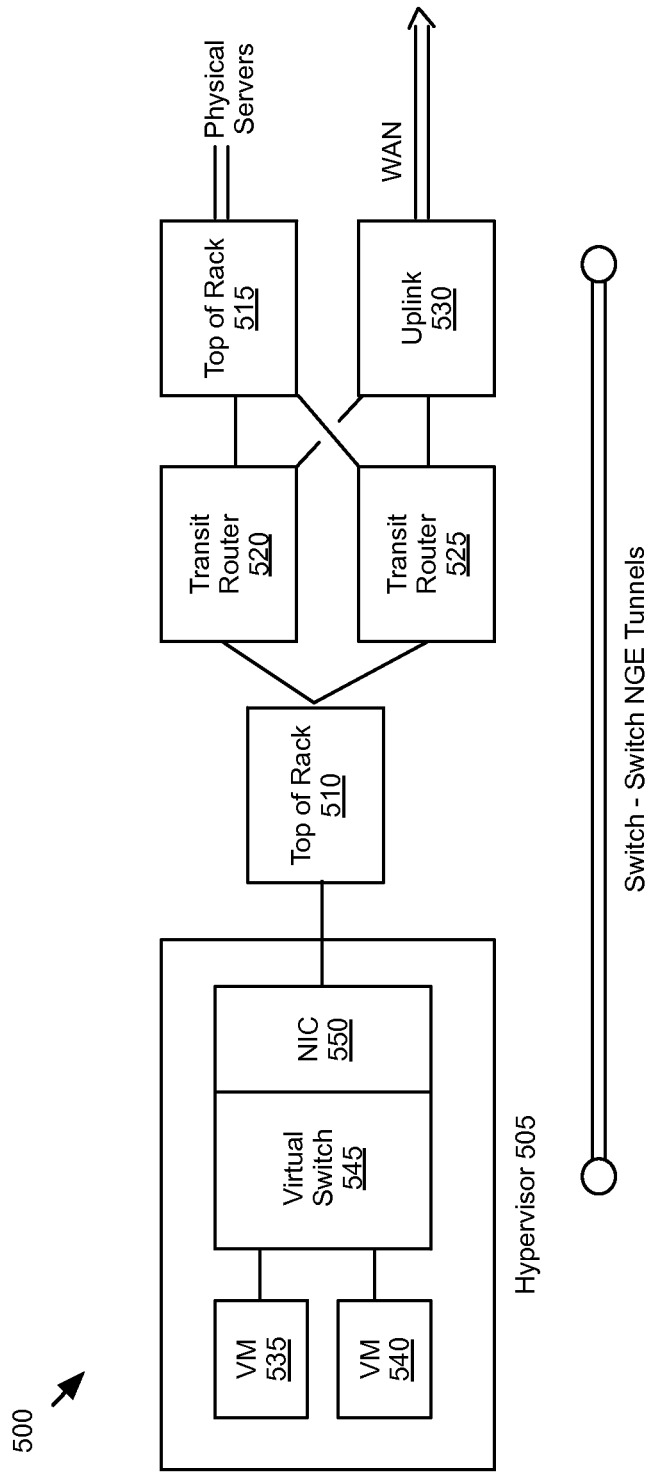
FIG. 5 shows an example of a hypervisor, top of rack switch for connectivity to physical servers, and a WAN uplink connected using NGE tunnels over a simplified Clos network.

FIG. 5 illustrates a network architecture 500 that supports such network virtualization. As shown, the figure includes a hypervisor 505, several top of rack switches 510 and 515, several transit routers 520 and 525, and a wide area network (WAN) uplink 530. The hypervisor 505 represent any type 1 native or type 2 bare metal hypervisor that can create and run VMs (e.g., VMs 535 and 540). Here, the hypervisor 505 is associated with a virtual switch 545 and a NIC 550.

FIG. 5 show an example of the hypervisor 505, the top of rack switch 510 for connectivity to physical servers, and the WAN uplink 530 connected using NGE tunnels over a simplified Clos network. These tunnels provide a virtual unicast or multicast Ethernet link between switches, which forward unencapsulated frames to and from attached components such as VMs or physical links.

In order to support the needs of network virtualization, the tunnel protocol of some embodiments is able to take advantage of the differing (and evolving) capabilities of each type of device in both the underlay and overlay networks. This can result in the following requirements being placed on the tunnel protocol:

The data plane is generic and extensible enough to support current and future control planes.

Tunnel components are efficiently implementable in both hardware and software without restricting capabilities to the lowest common denominator.

High performance over existing IP fabrics.

These example requirements are described further in the following subsections.

A. Control Plane Independence

Although some protocols for network virtualization have included a control plane as part of the tunnel format specification (most notably VXLAN with a multicast learning based control plane), these specifications have largely been treated as describing only the data format. VXLAN, despite being the most prescriptive, has actually seen the widest variety of control planes built on top of it. This should be seen not as a failure of the standardization process but as a success of innovation. There is a clear advantage in settling on a data format: most of the protocols are only superficially different and there is little advantage in duplicating effort. However, the same cannot be said of control planes, which are diverse in very fundamental ways. The case for standardization is also less clear given the wide variety in requirements, goals, and deployment scenarios.

As a result of this reality, NGE of some embodiments aims to be a pure tunnel format specification that is capable of fulfilling the needs of many control planes by explicitly not selecting any one of them. That is, NGE is a protocol designed to adapt to changing control plane implementations and the implementations' varying needs for metadata. This adaptability simultaneously promotes a shared data format and increases the chances that it will not become obsolete by future changes.

Achieving this level of flexibility effectively requires an options infrastructure to allow new metadata types to be defined, deployed, and either finalized or retired. Options also allow for differentiation of products by encouraging independent development in each vendor's core specialty, leading to an overall faster pace of advancement. By far the most common mechanism for implementing options is Type-Length-Value (TLV) format.

Although TLVs can be stored inside of a fixed length header, most commonly a variable length is used. This is not surprising considering the number of different possible control plane implementations and their varying needs for metadata: choosing a small fixed size will almost certainly impose restrictions in some cases while a large fixed size can impose an unnecessary bandwidth penalty in others—up to 30% in extreme cases. As a result, a variable header size is the most reasonable choice. Section II.B describes some of implications of this on implementations.

Network virtualization involves the cooperation of devices with a wide variety of capabilities such as software and hardware tunnel endpoints, transit fabrics, and centralized control clusters. As a result of their role in tying together different elements in the system, the requirements on tunnels are influenced by all of these components. Flexibility is therefore an important aspect of a tunnel protocol if it is to keep pace with the evolution of the system.

It should be noted that while options can be used to support non-wirespeed control frames, they are equally important on data frames as well to segregate and direct forwarding (for instance, the examples given before of input port based security policies and service interposition both require tags to be placed on data packets). Therefore, while it would be desirable to limit the extensibility to only control frames for the purposes of simplifying the datapath, that would not satisfy the design requirements.

B. Variable Length Header

There is often a conflict between software flexibility and hardware performance that is difficult to resolve. For a given set of functionality, it is obviously desirable to maximize performance. However, that does not mean new features that cannot be run at that speed today should be disallowed. Therefore, for a protocol to be efficiently implementable means that a set of common capabilities can be reasonably handled across platforms along with a graceful mechanism to handle more advanced features in the appropriate situations.

The use of a variable length header and options in a protocol often raises questions about whether it is truly efficiently implementable in hardware. To answer this question in the context of NGE, it is important to first divide "hardware" into three categories: NICs (specifically those that do not terminate tunnels, otherwise, they are endpoints), endpoints, and transit.

NICs are perhaps the easiest since they do not need to interpret options and require only knowledge of how much data to skip. A variable length header can still be a challenge, however, the relatively small number of operations (compared to a switching ASIC) that take place after parsing the header means the process is still manageable.

In some embodiments, endpoints are able to parse the variable header, including any options, and take action. Since these devices are actively participating in the protocol, they are the most affected by NGE. However, as endpoints are the ultimate consumer of the data, transmitters can tailor their output to the capabilities of the recipient. As new functionality becomes sufficiently well-defined to add to endpoints, supporting options can be designed using ordering restrictions and other techniques to ease parsing.

Transit devices are very similar to NICs since, as non-terminating devices, they do not need to interpret the options. In principle, the length could also be used to find the inner header although in practice, the complexity of these components generally precludes this. However, it is important to examine the benefits this tunnel introspection would provide. The goal of tunnel encapsulation is to ensure a clean separation between physical forwarding context and payload. In many ways, this can be viewed as analogous to MPLS where a label is imposed at the edge to provide forwarding context for transit. Therefore, while it can be difficult for transit routers to parse past any variable length portions, fortunately it is not necessary.

C. Use of Standard IP Fabrics

IP has clearly cemented its place as the dominant transport mechanism and many techniques have evolved over time to make it robust, efficient, and inexpensive. As a result, it is natural to use these existing fabrics as a transit for NGE. Fortunately, the use of IP encapsulation and addressing is enough to achieve the primary goal of delivering packets to the correct point in the network through standard switching and routing.

In addition, nearly all underlay fabrics are designed to exploit parallelism in traffic to spread load across multiple links without introducing reordering in individual flows. These equal cost multipathing (ECMP) techniques typically involve parsing and hashing the addresses and port numbers from the packet to select an outgoing link. However, the use of tunnels often results in poor ECMP performance without additional knowledge of the protocol as the encapsulated traffic is hidden from the fabric by design and only endpoint addresses are available for hashing.

Since it is desirable for NGE to perform well on these existing fabrics, it is necessary for entropy from encapsulated packets to be exposed in the tunnel header. The most common technique for this is to use the UDP source port, which is discussed further in Section 3.C.

III. Example NGE Encapsulation

Having described example design requirements, NGE encapsulation will now be described below by reference to FIGS. 6-11. In some embodiments, the NGE frame format is comprised of a compact tunnel header encapsulated in UDP over either IPv4 or IPv6. A small fixed tunnel header provides control information plus a base level of functionality and interoperability with a focus on simplicity. In some embodiments, this header is then followed by a set of variable options to allow for current and future innovations. Finally, the payload includes an Ethernet frame, complete with MAC headers. The following subsections provide examples of NGE frames transported (for example) over Ethernet.

A. NGE Frame Format Over IPv4

Figure 6:
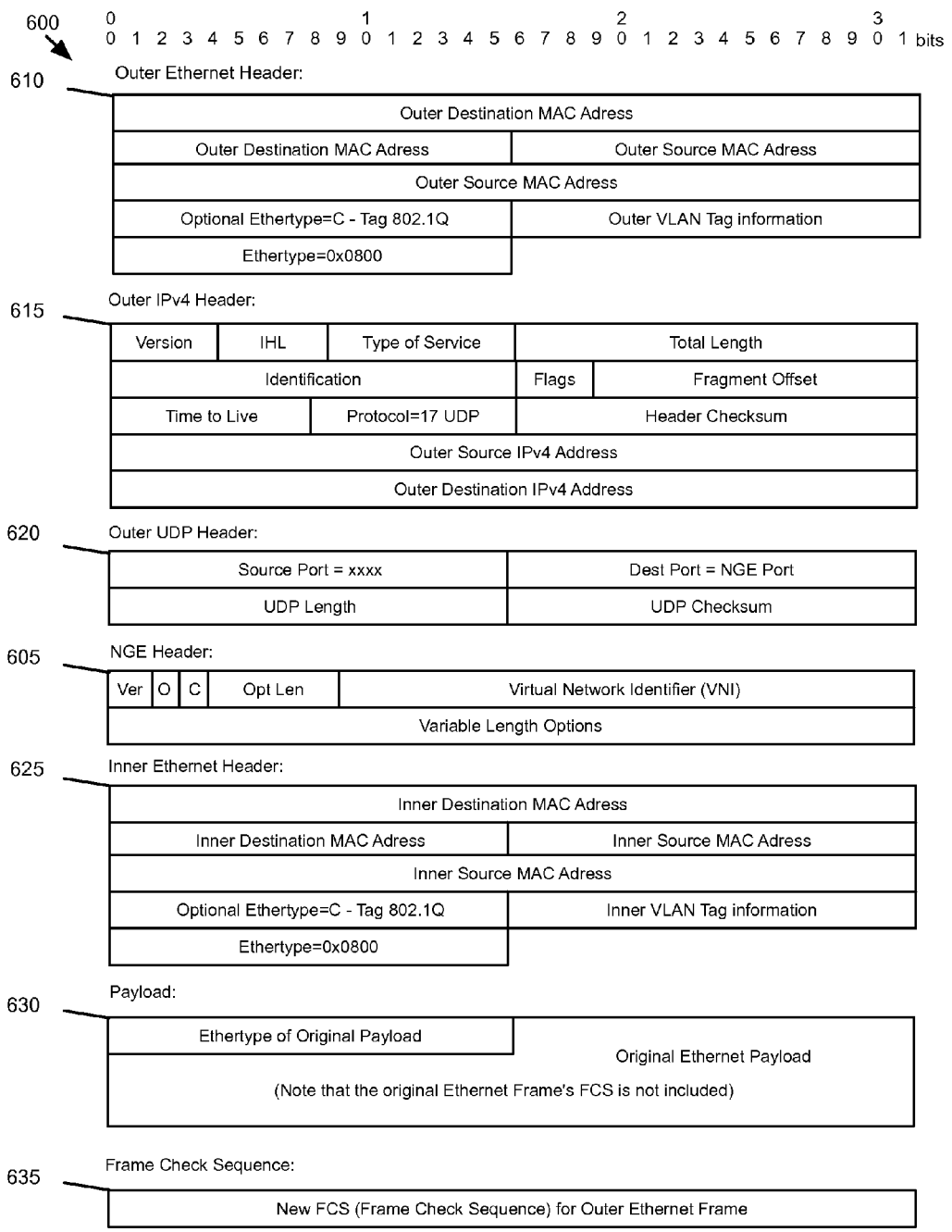
FIG. 6 provides an illustrative example of an NGE frame format over IPV4.

FIG. 6 provides an illustrative example of the format of a NGE frame 600 according to some embodiments. As shown, the frame 600 includes various data. The number of bits (i.e., bit length) for each piece of data is shown by the numbers that span horizontally across and above the frame 600. Here, each line represents 32-bit data. The figure also illustrates how the frame 600 is encapsulated with an NGE header 605. The figure also illustrates an outer Ethernet header 610, an outer IPv4 header 615, an outer UDP header 620, an inner Ethernet header 625, a payload 630, and a frame check sequence 635.

In some embodiments, NGE specifies that each tunnel option be in a Type-Length-Value format. The tunnel option of some embodiments includes option metadata and option data that is variable in bit length. The option metadata data may include any one or more of the following: (1) a type that indicates the format of the data contained in the tunnel option, (2) a length that specifies the length of the option, (3) a critical option for dropping the packet if any forwarding element that receives the packet does not recognize the tunnel option, and (4) and an option control flags. The variable option data and the option metadata are shown in the NGE header 605.

FIG. 6 also shows that the outer Ethernet header 610 includes various data, including an outer destination MAC address, an outer source MAC address, Ethertype, Optional Ethertype, and outer VLAN tag information. The outer IPv4 Header 615 includes an Internet Header Length (IHL), a type of service, a total length, an identification, flags, a frame offset, a time to live, a protocol, a header checksum, an outer source IPv4 address, and an outer destination IPv4 address. The outer UDP header 620 includes a source port, a destination port, a UDP length, and a UDP checksum. The inner Ethernet header 625 includes an inner destination MAC address, an inner source MAC address, Ethertype, Optional Ethertype, and inner VLAN tag information.

B. NGE Frame Format Over IPv6

Figure 7:
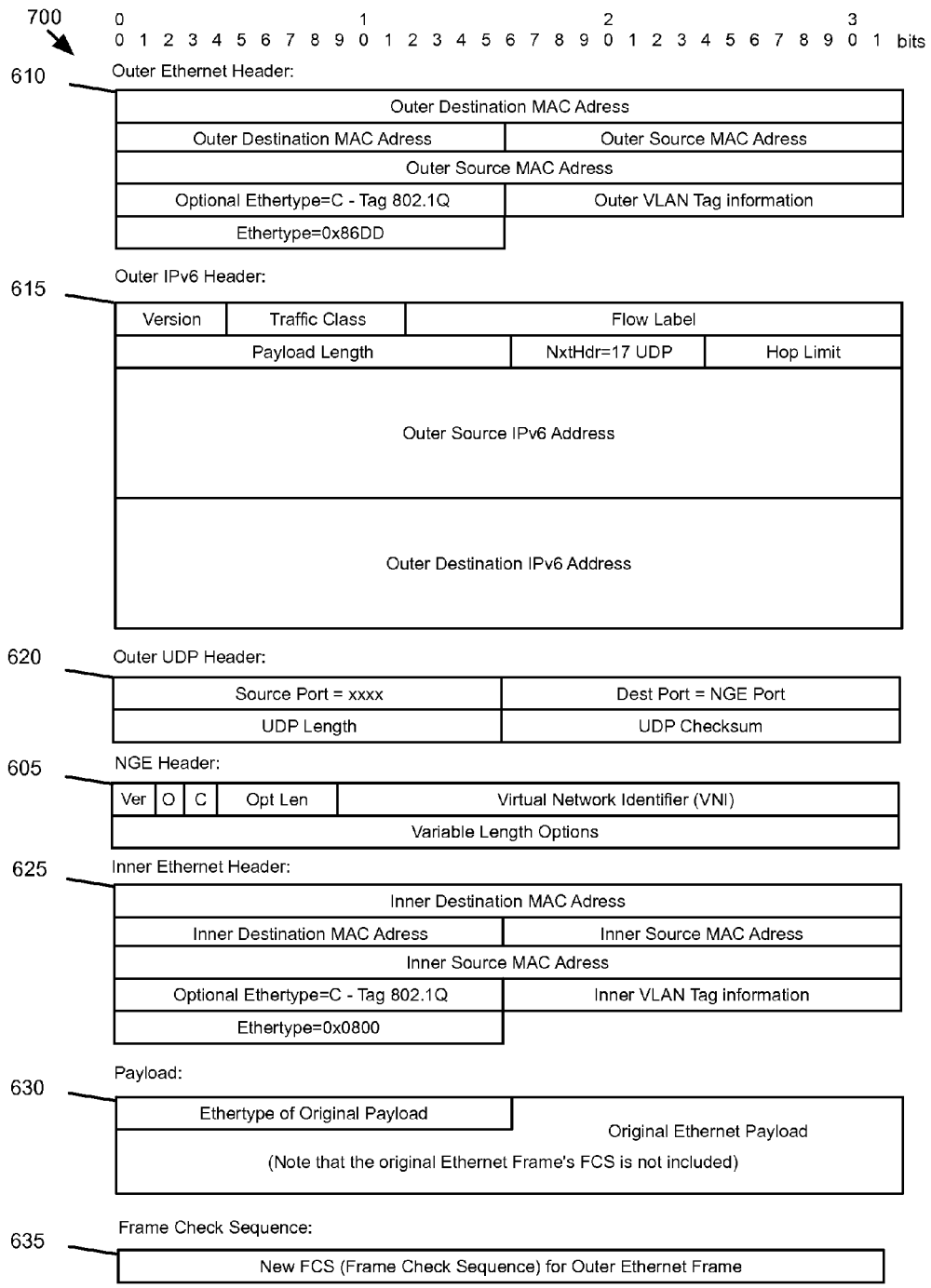
FIG. 7 provides an illustrative example of an NGE frame format over IPV6.

FIG. 7 provides an illustrative example of an NGE frame format over IPV6. This figure is similar to the previous figure; however, the outer IP header is for IPv6 instead of IPv4. This figure also illustrates how the frame 700 is encapsulated with an NGE header 705. In addition, the figure shows an outer Ethernet header 710, and an outer IPv6 header 715, an outer UDP header 720, an inner Ethernet header 725, a payload 730, and a frame check sequence 735.

C. UDP Header

The use of an encapsulating UDP header (see e.g., items 620 and 720 of FIGS. 6 and 7, respectively) follows the connectionless semantics of Ethernet and provides entropy to routers performing ECMP. The header fields are therefore interpreted as follows:

Source port: A source port selected by the ingress tunnel endpoint. This source port should be the same for all packets belonging to a single encapsulated flow to prevent reordering due to the use of different paths. To encourage an even distribution of flows across multiple links, the source port may be calculated using a hash of the encapsulated packet headers using, for example, a traditional 5-tuple. It is recommended that the source port chosen is from the ephemeral range (49152-65535) as defined by Internet Assigned Numbers Authority (IANA).

Destination Port (Dest port in FIGS. 6 and 7): Fixed well-known destination port to be allocated by IANA. This port in some embodiments is used in both directions of a flow. Since a port has not yet been assigned, it is recommended that implementations make this configurable.

UDP length: The length of the UDP packet including the UDP header.

UDP checksum: The checksum field may be set to zero on transmit for packets encapsulated in both IPv4 and IPv6. When a packet is received with a UDP checksum of zero it is in some embodiments accepted and decapsulated. If the ingress tunnel endpoint optionally encapsulates a packet with a non-zero checksum, it is in some embodiments a correctly computed UDP checksum. Upon receiving such a packet, the egress endpoint may validate the checksum. If the receiver chooses to perform verification and the checksum is not correct, the packet in some embodiments is dropped. Otherwise, the packet in such embodiments is accepted for decapsulation.

One of ordinary skill in the art would understand that UDP is just one example protocol for sending packets. For example, instead of UDP, the packets can be sent using another transmission protocol such as Transmission Control Protocol (TCP).

D. Tunnel Header Fields

Version Number (shown as Ver in FIGS. 2 and 3) (2 bits): The current version number is 0. Packets received by an endpoint with an unknown version are dropped, in some embodiments. Non-terminating devices processing NGE packets with an unknown version number treat them as UDP packets with an unknown payload, in some embodiments.

OAM frame (shown as O in FIGS. 2 and 3) (1 bit): This packet contains a control message instead of an Ethernet payload. In some embodiments, Endpoints do not forward the payload and non-terminating devices do not attempt to interpret or process it. Since these are infrequent control messages, it is recommended in some embodiments that these packets be directed to a high priority control queue (for example, to direct the packet to a general purpose CPU from a forwarding ASIC or to separate out control traffic on a NIC). In some embodiments, transit routers do not alter forwarding behavior on the basis of this bit, such as ECMP link selection.

Critical options present (shown as C in FIGS. 2 and 3) (1 bit): One or more options has the 'C' bit set. If this bit is set then tunnel endpoints of some embodiments parse the options list to interpret any critical options. If no option types are supported then endpoints may silently drop the frame on the basis of the 'C' bit (including invalid combinations such as 'C' bit set and 'Opt Len' is zero or no options with a corresponding 'C' bit). If the bit is not set, tunnel endpoints may strip all options using 'Opt Len' and forward the frame.

Length of the options fields (shown as Opt Len in FIGS. 2 and 3) (4 bits): The length of the options fields, expressed in four byte multiples, not including the four byte fixed tunnel header. This results in a minimum total NGE header size of 4 bytes and a maximum of 64 bytes. The payload Ethernet MAC header can be found using this offset from the end of the base NGE header.

In some embodiments, transit devices maintain consistent forwarding behavior irrespective of the value of Opt Len, including ECMP link selection. These devices should be able to forward packets containing options without resorting to a slow path.

Note that in many ASIC-based endpoint implementations the processing of options may not be supported in the forwarding fast path, resulting in the use of a slower processing path. Load on this slow path may result in packets being dropped.

Virtual Network Identifier (VNI) (24 bits): An identifier for a unique element of a virtual network. In many situations, this may represent an L2 segment; however, the control plane defines the forwarding semantics of decapsulated packets. The VNI may be used as part of ECMP forwarding decisions or may be used as a mechanism to distinguish between overlapping address spaces contained in the encapsulated packet when load balancing across CPUs.

In some embodiments, the VNI is also referred to as a logical forwarding element identifier. This is because the identifier is used to effectuate the creation of the logical forwarding element from several managed edge forwarding elements. That is, two or more edge managed forwarding elements use the same VNI to create a separate broadcast domain for a set of machines attached their virtual interfaces or ports.

E. Tunnel Options

Figure 8:
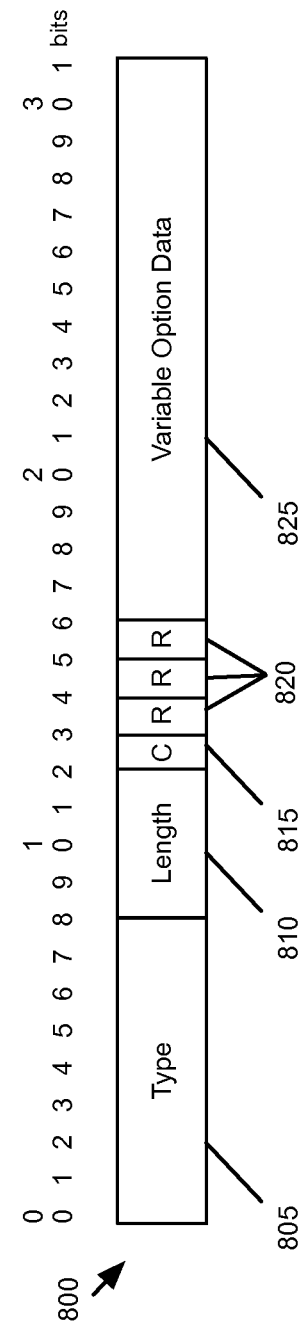
FIG. 8 provides an illustrative example of an NGE Option.

The base NGE header is followed by zero or more options in Type-Length-Value format. In some embodiments, each option is comprised of a two-byte option header (also referred to herein as rich logical context tag header) and a variable amount of option data interpreted according to the type. FIG. 8 provides an illustrative example of a NGE tunnel option 800 according to some embodiments. The tunnel option or rich logical context tag includes various option metadata, including a type 805, length 810, critical option 815, and a set of option control flags 820. The number of bits of each piece of metadata is expressed by the numbers that span horizontally across and above the tunnel option 800.

Type 805 (8 bits): Type indicating the format of the data contained in this option. Section 3.E.1 discusses the option types.

Length 810 (4 bits): Length of the option, expressed in four byte multiples, including the option header. In some embodiments, each option may be between four and sixty bytes. Packets containing one or more zero length options or where the total length of all options exceeds Opt Len in the base header are invalid and are silently dropped, in some embodiments.

Critical option 815 (shown as C in FIG. 8) (1 bit): In some embodiments, if the receiving endpoint does not recognize this option and this bit is set then the frame is dropped. If the 'C' bit is set in any option then the 'C' bit in the NGE base header is also set, in some embodiments.

Option control flag 820 (shown as R in FIG. 8) (each option equal 1 bit): Option control flag of some embodiments is reserved for future use. In some embodiments, the option control flag is zero on transmission and ignored on receipt.

Variable option data 825: Option data interpreted according to Type. As each option is a multiple of four bytes, option data of some embodiments includes any appropriate padding to reach the correct total length. As mentioned above, in some embodiments, each option is between four and sixty bytes. One of ordinary skill in the art would understand that the NGE option shown in FIG. 8 is one example option format and that the option can be defined differently.

1. Option Types

Options are primarily designed to encourage future extensibility and innovation. Therefore, standardized forms of these options may be defined later. However, some embodiments provide at least one option type. The following is an example of such an option type:

Type 0-Label (variable length): A label enables the encoding of locally significant metadata associated with the packet. The ultimate meaning is determined by the control plane, which is also responsible for the distribution of label values.

As an NGE frame traverses the network, there are many possible types of devices in the path, and new option definitions should be defined to take into consideration the interactions with them to ensure compatibility. The behavior of these devices is described in the following Section III.E.2

2. Options Processing

In some embodiments, NGE options are intended to be interpreted only by tunnel endpoints and not intermediate nodes (in other words, they are exclusively destination options and not hop-by-hop options). As a result, the behavior of an intermediate device processing NGE frames does not alter the meaning of associated options, including those unknown to the device. The following examples describe how these rules apply to several classes of devices:

Transit switches: In some embodiments, the behavior of transit devices is not affected by the value or presence of options. One possible use case for options is to implement connectivity checks or other OAM functions. In that case, it is likely that data packets may use one set of options and connectivity checks a different set. In order for the connectivity check to be valid, it traces the same path as data frames; therefore, it is important that forwarding behavior be exactly the same, in some embodiment.

Non-terminating NICs: The implementation of many offloads requires only that the encapsulated packet be easily parsed (for example, checksum offload). However, optimizations such as LSO and LRO involve some processing of the options themselves since they must be replicated/merged across multiple packets. In these situations, it is desirable to not require changes to the offload logic to handle the introduction of new options. To enable this, some constraints are placed on the definitions of options to allow for simple processing rules. The following are example of such processing rules:

In some embodiments, an option is applied equally to all packets within a flow, such as a TCP or UDP stream. When performing LSO, a NIC of some embodiments replicates the entire NGE header, including all options, onto each resulting segment. Conversely, when performing LRO, a NIC of some embodiments assume that a binary comparison of the options is sufficient to ensure equality and may merge packets with equal NGE headers.

Option ordering is not significant and packets with the same options in a different order may be merged.

In some embodiments, NICs performing offloads do not drop packets with unknown options, including those marked as critical.

Tunnel endpoints: The generation and interpretation of options is determined by the control plane. However, to improve interoperability with heterogeneous devices, packets containing unknown options with the 'C' bit set are dropped, in some embodiments. Endpoint implementations do not assume that options will be processed sequentially by the receiver in the order they were transmitted, in some embodiments.

Middleboxes: Intrusion prevention systems, load balancers, and other types of middleboxes generally fall into two categories: those that terminate the tunnels and those that do not. Devices in the former category act as tunnel endpoints and follow the associated requirements, including interfacing with the control plane. The handling of options between NGE domains, such as whether to propagate, modify, or strip options, is defined by the option definition and control plane. Middleboxes that do not terminate tunnels act as transit devices. In some embodiments, this mode of operation is not recommended to the ability of options to significantly alter the interpretation of the payload.

F. Example Processes

Figure 9:
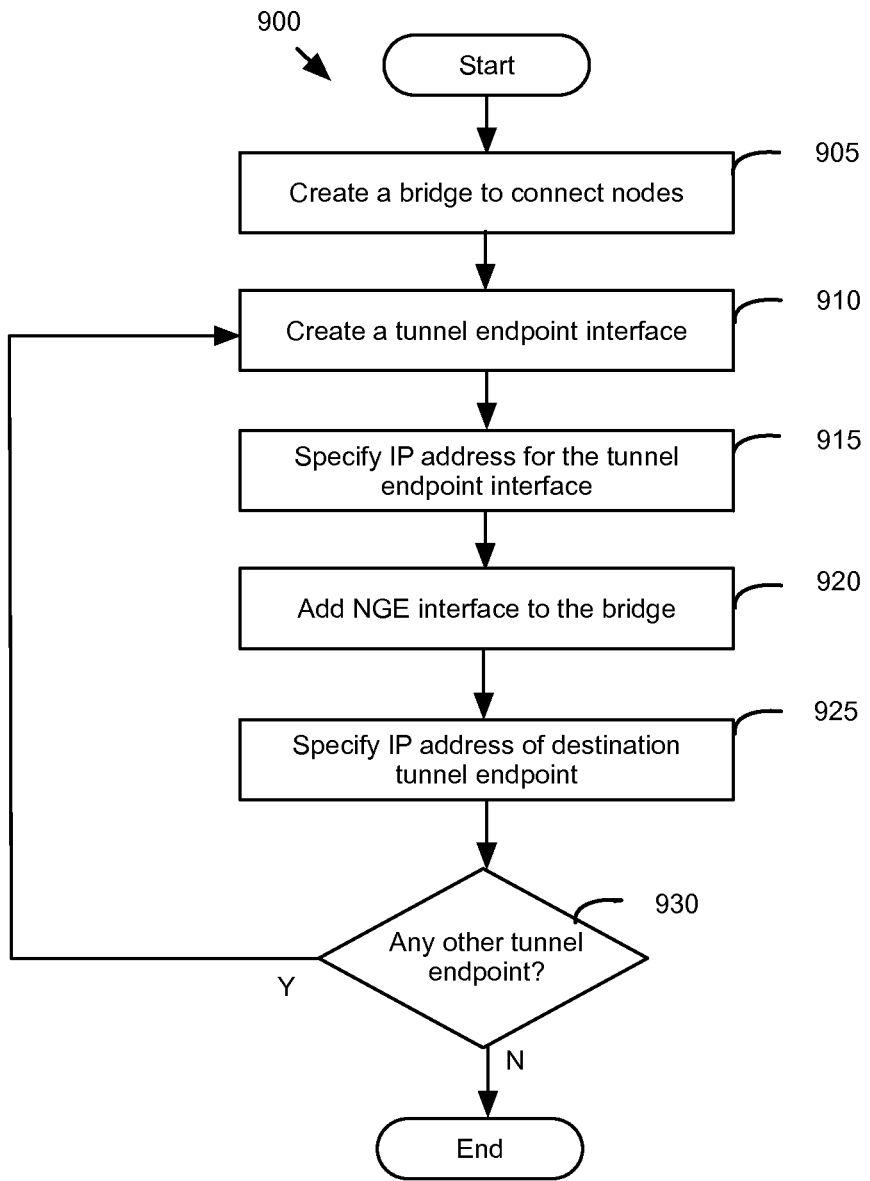
FIG. 9 conceptually illustrates a process that some embodiments perform to establish an NGE tunnel.

Having described details of an example NGE protocol, several processes will now be described below by reference to FIGS. 9-11. FIG. 9 conceptually illustrates a process that some embodiments perform to establish an NGE tunnel. The process 900 begins when it creates (at 905) a bridge to connect different nodes (e.g., VMs). The process 900 then creates (at 910) a tunnel endpoint interface.

At 915, the process 900 specifies an address (e.g., an IP address) for the tunnel endpoint interface. The process 900 then specifies (at 920) an NGE interface to the bridge. The process 900 specifies (at 925) an IP address of the destination tunnel endpoint. The process 900 then determines (at 930) whether there is any other tunnel endpoint. If so, the process 900 returns to 910 described above in order to configure that other tunnel endpoint. Otherwise, the process 900 ends.

Some embodiments perform variations on the process 900. The specific operations of the process 900 may not be performed in the exact order shown and described. The specific operations may not be performed in one continuous series of operations, and different specific operations may be performed in different embodiments.

Figure 10:
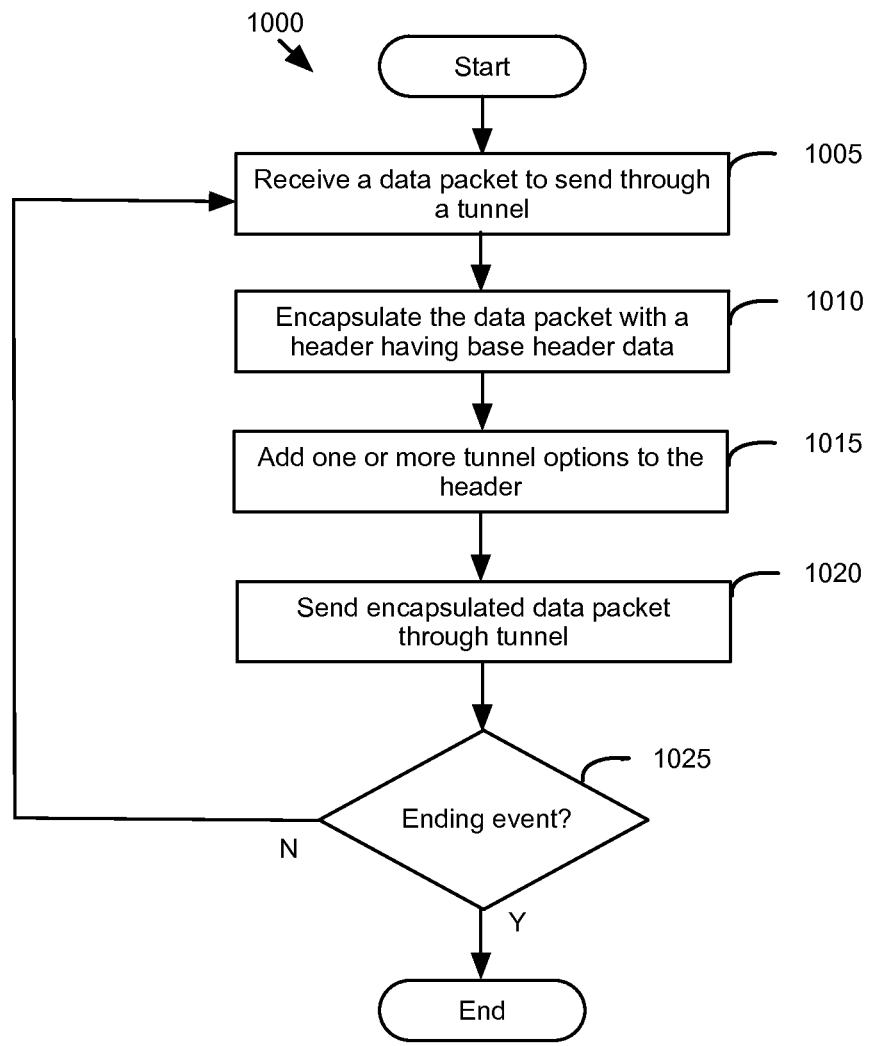
FIG. 10 conceptually illustrates a process that some embodiments perform to encapsulate data packets.
Figure 11:
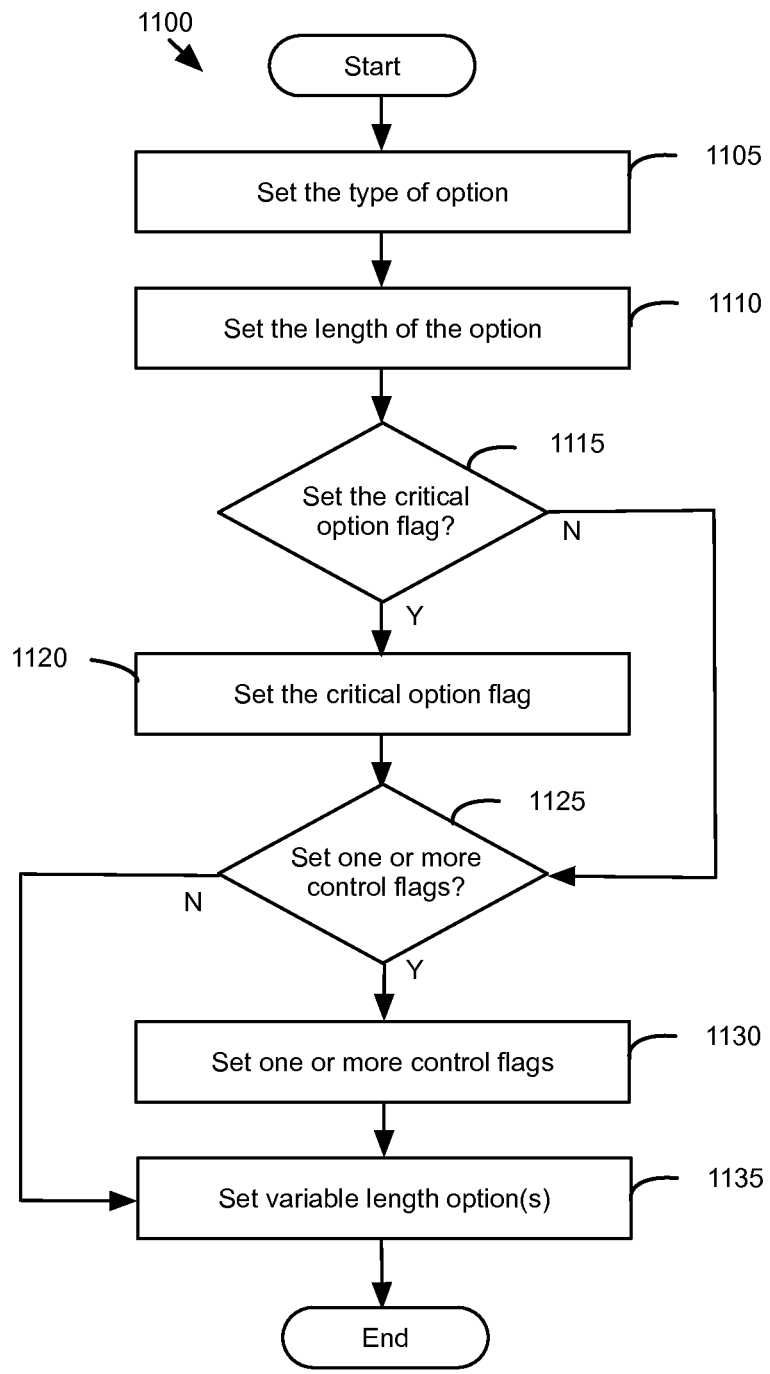
FIG. 11 conceptually illustrates a process that some embodiments perform to populate a header with one or more tunnel options.

FIG. 10 conceptually illustrates a process 1000 that some embodiments perform to encapsulate data packets. In some embodiments, the process 1000 is performed by a forwarding element (e.g., a switch on the transit side).

As shown in FIG. 10, the process 1000 start when it receives (at 1005) a data packet to send through a tunnel. In some embodiments, sending a data packet through a tunnel means encapsulating the packet with a header and using control information in the encapsulated header to send the packet to a destination. The received data packet in some embodiments includes one or more headers representing the different layers of the OSI model and payload (e.g., content data, user data).

At 1010, the process 1000 then encapsulates the data packet with a header and populates the header with base header data. In some embodiments, the base header data includes a Virtual Network Identifier (VNI). The VNI is an identifier for a unique element of a virtual network. In some embodiments, the base header also includes any one or more of the following: a version number, a length of each option, an Operations, Administration, and Management (OAM) frame, and a set of critical options.

The process 1000 then adds (at 1015) one or more tunnel options to the header. An example process for adding one or more tunnel options will be described in detail below by reference to FIG. 11. Next, the process 1000 then sends (at 1020) the data packet through the tunnel.

At 1025, the process 1000 determines whether there has been an ending event. Some examples of ending events include turning off the forwarding element or turning off a computing device on which the forwarding element executes. When there is an ending event, the process 1000 ends. Otherwise, the process 1000 returns to 1005, which is described above.

Some embodiments perform variations on the process 1000. The specific operations of the process 1000 may not be performed in the exact order shown and described. The specific operations may not be performed in one continuous series of operations, and different specific operations may be performed in different embodiments.

The previous figure illustrated an example process for encapsulating a data packet with a header having one or more tunnel options. FIG. 11 conceptually illustrates a process 1100 that some embodiments perform to populate such a header with such tunnel options. In some embodiments, the process 1000 is performed a forwarding element (e.g., a switch on the transit side). The process 1100 of some embodiments is a part of a larger process (e.g., the process 1000 of FIG. 10) for encapsulating data packets.

The process 1100 begins by adding at least a first tunnel option to a packet header. The process 1100 might have previously added base header data (e.g., VNI, a version number, a length of each option, an OAM frame, etc.). In adding the tunnel option, the process 1100 specifies (at 1105) the type of option. The process 1100 then specifies (at 1110) the length of the option. At 1115, the process 1100 specifies (at 1115) a critical option if necessary. The process specifies (at 1120) any one or more control flags if necessary. The process 1100 then specifies (at 1125) data for the variable option. All of these option attributes are describe above by reference to FIG. 8. After 1125, the process 1100 then ends.

Some embodiments perform variations on the process 1100. The specific operations of the process 1100 may not be performed in the exact order shown and described. The specific operations may not be performed in one continuous series of operations, and different specific operations may be performed in different embodiments.

IV. Encapsulation of NGE in IP

As an IP-based tunnel protocol, NGE shares many properties and techniques with existing protocols. The application of some of these are described in further detail, although in general most concepts applicable to the IP layer or to IP tunnels generally also function in the context of NGE.

A. IP Fragmentation

In order to prevent fragmentation and maximize performance, the best practice when using NGE of some embodiments is to ensure that the MTU of the physical network is greater than or equal to the MTU of the encapsulated network plus tunnel headers. Manual or upper layer (such as TCP MSS clamping) configuration can be used to ensure that fragmentation never takes place; however, in many situations this may not be feasible.

In some embodiments, it is recommended that Path MTU Discovery be used by setting the DF bit in the IP header when NGE packets are transmitted over IPv4 (this is the default with IPv6). The use of Path MTU Discovery on the transit network provides the encapsulating endpoint with soft-state about the link that it may use to prevent or minimize fragmentation depending on its role in the virtualized network.

If necessary, it is recommended that fragmentation be performed preferentially on the encapsulated payload, in some embodiments. This may be possible if the encapsulating endpoint is also acting as an L3 node in the virtualized network, in which case the endpoint might use the derived transit MTU and the tunnel header length to either implement Path MTU Discovery or fragment the inner packet to the correct size.

In many cases it may not be possible or desirable for the tunnel endpoint to interact with the payload, such as when implementing a completely transparent L2 bridge. In these situations, fragmentation of the transit IP header may be performed to ensure connectivity. In some embodiments, if a packet is fragmented endpoints should use the path MTU of the transit link to ensure a size is chosen such that fragmentation is only required once between endpoints.

B. DSCP and ECN

When encapsulating IP (over Ethernet) frames in NGE, there are several options for propagating DSCP and ECN bits from the inner header to the tunnel on transmission and the reverse on reception.

RFC2983, entitled "Differentiated Services and Tunnels", published October 2000, lists considerations for mapping DSCP between inner and outer IP headers. Network virtualization is typically more closely aligned with the Pipe model described, where the DSCP value on the tunnel header is set based on a policy (which may be a fixed value, one based on the inner traffic class, or some other mechanism for grouping traffic). Aspects of the Uniform model (which treats the inner and outer DSCP value as a single field by copying on ingress and egress) may also apply, such as the ability to remark the inner header on tunnel egress based on transit marking. However, the Uniform model is not conceptually consistent with network virtualization, which seeks to provide strong isolation between encapsulated traffic and the physical network.

RFC6040, entitled "Tunnelling of Explicit Congestion Notification", published November 2010, describes the mechanism for exposing ECN capabilities on IP tunnels and propagating congestion markers to the inner packets. In some embodiments, this behavior should be followed for IP packets encapsulated in NGE.

C. Broadcast and Multicast

NGE tunnels may either be point-to-point unicast between two endpoints or may utilize broadcast or multicast addressing. It is not required that inner and outer addressing match in this respect. For example, in physical networks that do not support multicast, encapsulated multicast traffic may be replicated into multiple unicast tunnels or forwarded by policy to a unicast location (possibly to be replicated there).

With physical networks that do support multicast, it may be desirable to use this capability to take advantage of hardware replication for encapsulated packets. In this case, multicast addresses may be allocated in the physical network corresponding to tenants, encapsulated multicast groups, or some other factor. The allocation of these groups is a component of the control plane.

V. Interoperability Issues

Viewed exclusively from the data plane, NGE does not introduce any interoperability issues as it appears to most devices as UDP frames. However, as there are already a number of tunnel protocols deployed in network virtualization environments, there is a practical question of transition and coexistence.

Since NGE is a superset of the functionality of the three most common protocols used for network virtualization (VXLAN, NVGRE, and STT) it should be straightforward to port an existing control plane to run on top of it with minimal effort. With both the old and new frame formats supporting the same set of capabilities, there is no need for a hard transition—endpoints directly communicating with each other use any common protocol, which may be different even within a single overall system. As transit devices are primarily forwarding frames on the basis of the IP header, all protocols appear similar and these devices do not introduce additional interoperability concerns.

In order to assist with this transition, it is strongly suggested that implementations support simultaneous operation of both NGE and existing tunnel protocols as it is expected to be common for a single node to communicate with a mixture of other nodes. Eventually, older protocols may be phased out, as they are no longer in use.

VI. Security Considerations

As UDP/IP packets, NGE does not have any inherent security mechanisms. As a result, an attacker with access to the underlay network transporting the IP frames has the ability to snoop or inject packets. Legitimate but malicious tunnel endpoints may also spoof identifiers in the tunnel header to gain access to networks owned by other tenants.

Within a particular security domain, such as a data center operated by a single provider, the most common and highest performing security mechanism is isolation of trusted components. Tunnel traffic can be carried over a separate VLAN and filtered at any untrusted boundaries. In addition, tunnel endpoints should only be operated in environments controlled by the service provider, such as the hypervisor itself rather than within a customer VM.

When crossing an untrusted link, such as the public Internet, IPsec may be used to provide authentication and/or encryption of the IP packets. If the remote tunnel endpoint is not completely trusted, for example, it resides on a customer premises, then it may also be necessary to sanitize any tunnel metadata to prevent tenant-hopping attacks.

VII. IANA Considerations

A UDP destination port in the user range (1024-49151) will be requested from Internet Assigned Numbers Authority (IANA).

VIII. Example Uses

As mentioned above, NGE is a protocol that is adapted to change with different control plane implementations and the implementations' varying needs for metadata. Accordingly, its use can depend on control plane implementations and advancements.

In some embodiments, the protocol can be used to embed different types of context data. As an example, the logical context that is stored in the packets can specify rich information about the network ID (the context identifier) and about the logical processing pipeline (e.g., data specifying the stage of the logical processing pipeline). An example of such logical context use will now be described below by reference to FIGS. 12-14.

Figure 12:
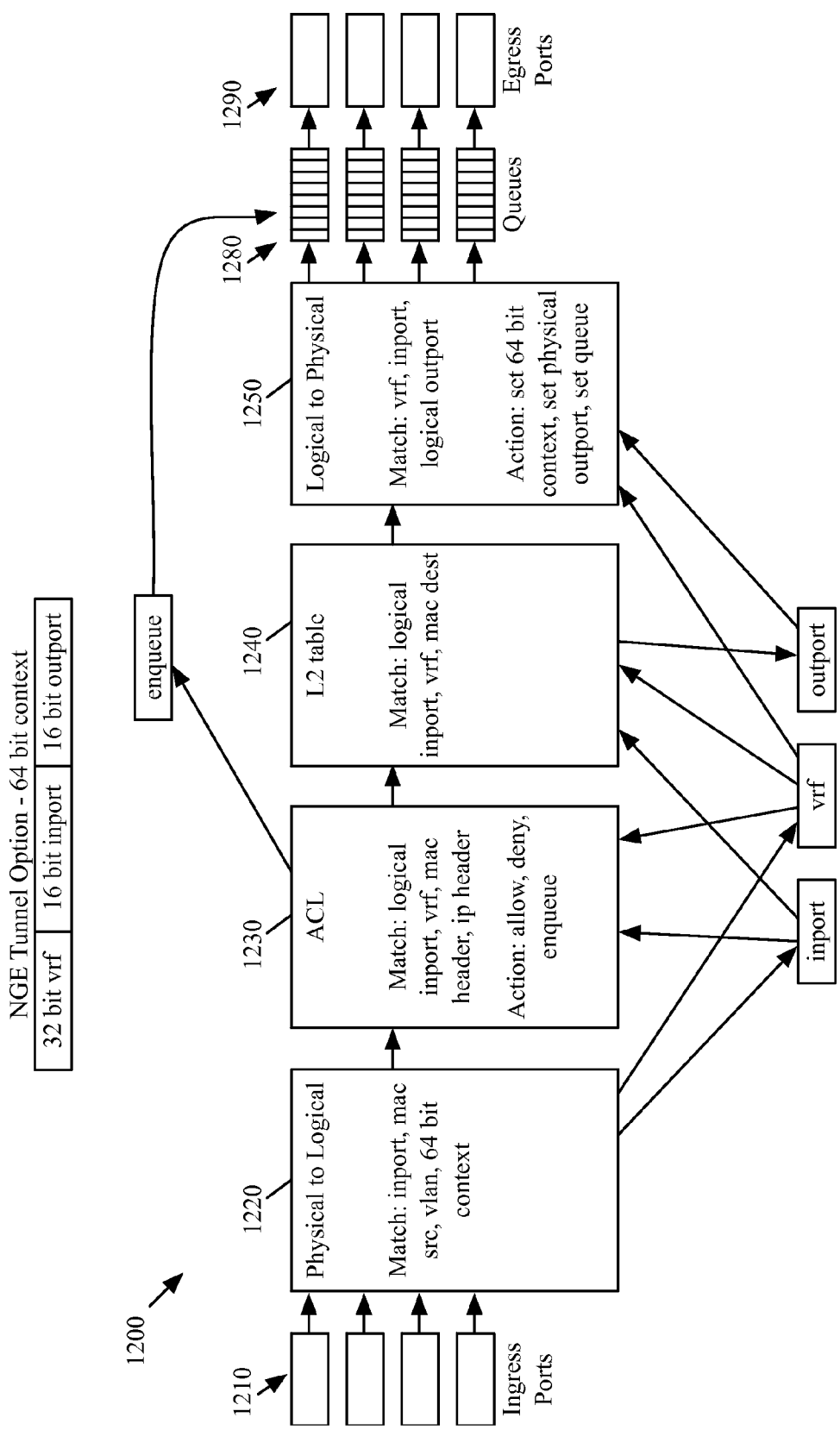
FIG. 12 conceptually illustrates a processing pipeline of some embodiments for processing a packet through a logical switching element.

FIG. 12 conceptually illustrates a processing pipeline 1200 of some embodiments for processing a packet through a logical switching element. In particular, the processing pipeline 1200 includes four stages 1220-1250 for processing a packet, by operating on a 64 bit logical context tag (e.g., in an NGE header) of the packet, through a logical switching element that is implemented across a set of managed switching elements in a managed network. In some embodiments, each managed switching element in the managed network that receives the packet performs the processing pipeline 1200 when the managed switching element receives the packet.

As mentioned above, a packet, in some embodiments, includes a header and a payload. In some embodiments, the header includes a set of fields that contains information used for routing the packet through a network. Switching elements may determine switching decisions based on the fields contained in the header and may, in some cases, modify some or all of the header fields. Some embodiments determine switching decisions based on flow entries in the switching elements' forwarding tables.

In the example of FIG. 12, the 64-bit context tag is a field (e.g., a tunnel option) that is included in the NGE header of a packet. As shown, the 64-bit context tag includes a 32-bit virtual routing function (VRF) field, a 16-bit logical inport field, and a 16-bit logical outport field. The 32 bit VRF field represents the logical switching element to which the packet belongs and the stage of the logical forwarding plane of the logical switching element the packet is at, the 16 bit logical inport field represents the logical port of the logical switching element through which the packet was received, and the 16 bit logical outport field represents the logical port of the logical switching element through which the packet is to be transmitted.

In some embodiments, the processing pipeline 1200 may be implemented by flow entries in the managed switching elements in the network. For instance, some or all of the flow entries are defined such that the packet is processed against the flow entries based on the 64-bit logical context tag in the packet's header. Therefore, in some of these embodiments, the managed switching elements are configured with such flow entries.

As shown, FIG. 12 illustrates a set of ingress ports 1210, a set of queues 1280, and a set of egress ports 1290. The set of ingress ports 1210, the set of queues 1280, and the set of egress ports 1290 are similar to the set of ingress ports 1210, the set of queues 1280, and the set of egress ports 1290, respectively. The set of ingress ports 1210 conceptually represent a set of ports (e.g., a tunnel port, network interface cards (NICs), virtual interfaces (VIFs), physical interfaces (PIFs)) of the managed switching element that is performing the processing pipeline 1200. The ingress ports 1210 are ports through which the managed switching element receives packets. The set of queues 1280 conceptually represents a set of queues of the managed switching element that is performing the processing pipeline 1200. In some embodiments, the set of queues 1280 are for implementing resource control mechanisms, such as quality of service (QoS). The set of egress ports 1290 conceptually represent a set of ports (e.g., a tunnel port, NICs, VIFs, PIFs) of the managed switching element that is performing the processing pipeline 1200. The egress ports 1290 are ports through which the managed switching element sends packets. In some embodiments, at least one port in the set of ingress ports 1210 is also a port in the set of egress ports 1290. In some embodiments, the set of ingress ports 1210 and the set of egress ports 1290 are the same set of ports. That is, the managed switching element includes a set of ports that are used both to receive packets and to send packets.

At the first stage 1220 of the processing pipeline 1200, a physical to logical mapping is performed on a packet to determine the logical context of the packet. In this example, the physical to logical mapping of the first stage 1220 determines the logical switching element to which the packet belongs, the stage of the logical forwarding plane of the logical switching element the packet is at, and the logical port of the logical switching element through which the packet was received. In some embodiments, the first stage 1220 is performed when the logical switching element receives the packet (e.g., the packet is initially received by a managed switching element in the network that implements the logical switching elements).

Different embodiments determine the logical context of a packet based on different fields of the packet's header. For instance, as shown in FIG. 12, some embodiments determine the logical context of a packet based on the source MAC address of the packet (i.e., the machine from which the packet was sent), an inport (i.e., an ingress port in the set of ingress ports 1210) of the packet (i.e., the physical port of the managed switching element through which the packet was received), a VLAN id, the 64 bit context tag, or any combination of the four fields.

After the first stage 1220 is performed, some embodiments store the information that represents the logical context in the packet's 64-bit logical context tag, as illustrated by arrows from the stage 1220 to the corresponding fields below. For example, the logical switching element to which the packet belongs and the stage of the logical forwarding plane of the logical switching element the packet is at is stored in the 32-bit VRF field, and the logical port of the logical switching element through which the packet was received is stored in the 16-bit logical inport field.

In some embodiments, the second stage 1230 is defined for the logical switching element. In this example, the second stage 1230 operates on the packet's 64-bit logical context tag to determine access control of the packet with respect to the logical switching element. As shown by arrows pointing from the fields below to the stage 1230, an ACL operates on the 16 bit logical inport field and the 32 bit VRF field of the packet's 64 bit logical context tag, which results in allowing the packet to be further processed (e.g., by the third stage 1240), denying the packet (i.e., dropping the packet), or enqueuing the packet. In some embodiments, enqueuing the packet involves sending the packet to a queue in the set of queues 1280 that is associated with a port in the set of egress ports 1290 for QoS purposes. In addition, the ACL may be defined to implement other ACL functionalities (not shown), such as counters, port security (e.g., allow packets received through a port that originated only from a particular machine(s)), and machine isolation (e.g., allow broadcast/multicast packets received from a particular machine to be sent to only machines that belong to the same tenant or logical switching element), among ACL functionalities.

In the third stage 1240 of the processing pipeline 1200, the packet is processed against a logical L2 (layer 2) table to determine a logical outport, which corresponds to a logical port of the logical switching element through which the packet is to be sent. As shown by arrows pointing from the fields below to the stage 1240, the L2 table operates on the 16-bit logical inport field and the 32-bit VRF field of the packet's 64-bit logical context tag in addition to the destination MAC address of the packet. After the third stage 1240 is performed, some embodiments store the information that represents the determined logical outport in the 16-bit logical outport field of the packet's 64-bit logical context tag, as illustrated by an arrow from the stage 1240 to the outport field below.

At the fourth stage 1250 of the processing pipeline 1200, a logical to physical mapping is performed to identify one or more physical ports of one or more managed switching elements in the managed network that corresponds to the logical outport, which was determined in the third stage 1240, of the logical switching element. For this example, the fourth stage 1250 operates on the packet's 64 bit logical context tag to identify one or more physical ports in the set of egress ports 1290 through which to send the packet out in order for the packet to reach the determined logical outport. As shown by arrows pointing from the fields below to the stage 1250, the fourth stage 1250 operates on the 16 bit logical outport field and the 32 bit VRF field of the packet's 64 bit logical context tag, which results in setting the 64 bit logical context tag (e.g., saving the stage of the logical switching element that the packet is at, removing the 64 bit logical context tag), setting the one or more queues in the set of queues 1280 associated with the physical ports, and setting the one or more physical ports in the set of egress ports 1290 through which to send the packet out.

As mentioned above, in some embodiments, the processing pipeline 1200 is performed by each managed switching element in the managed network that is used to implement the logical switching element. The processing pipeline 1200 of some embodiments may be distributed across the managed switching elements in the managed network. For example, in some embodiments, the second and third stages 1230 and 1240 are distributed across the managed switching elements in the managed network. In some of these embodiments, the managed switching element that initially receives the packet may perform the first fourth stages 1220 1250 and the remaining managed switching elements that subsequently receive the packet only perform the first and fourth stages 1220 and 1250.

In the above description of FIG. 12, reference to "physical" components (e.g., physical switching element, physical ports, etc.) refers to the managed switching elements in the managed network. A managed switching element may be a hardware-switching element, a software-switching element, or a virtual switching element. Thus, one of ordinary skill in the art will realize that the reference to a physical component is not meant to refer to an actual physical component, but rather the reference is meant to distinguish from logical components (e.g., a logical switching element, a logical port, etc.).

Figure 13:
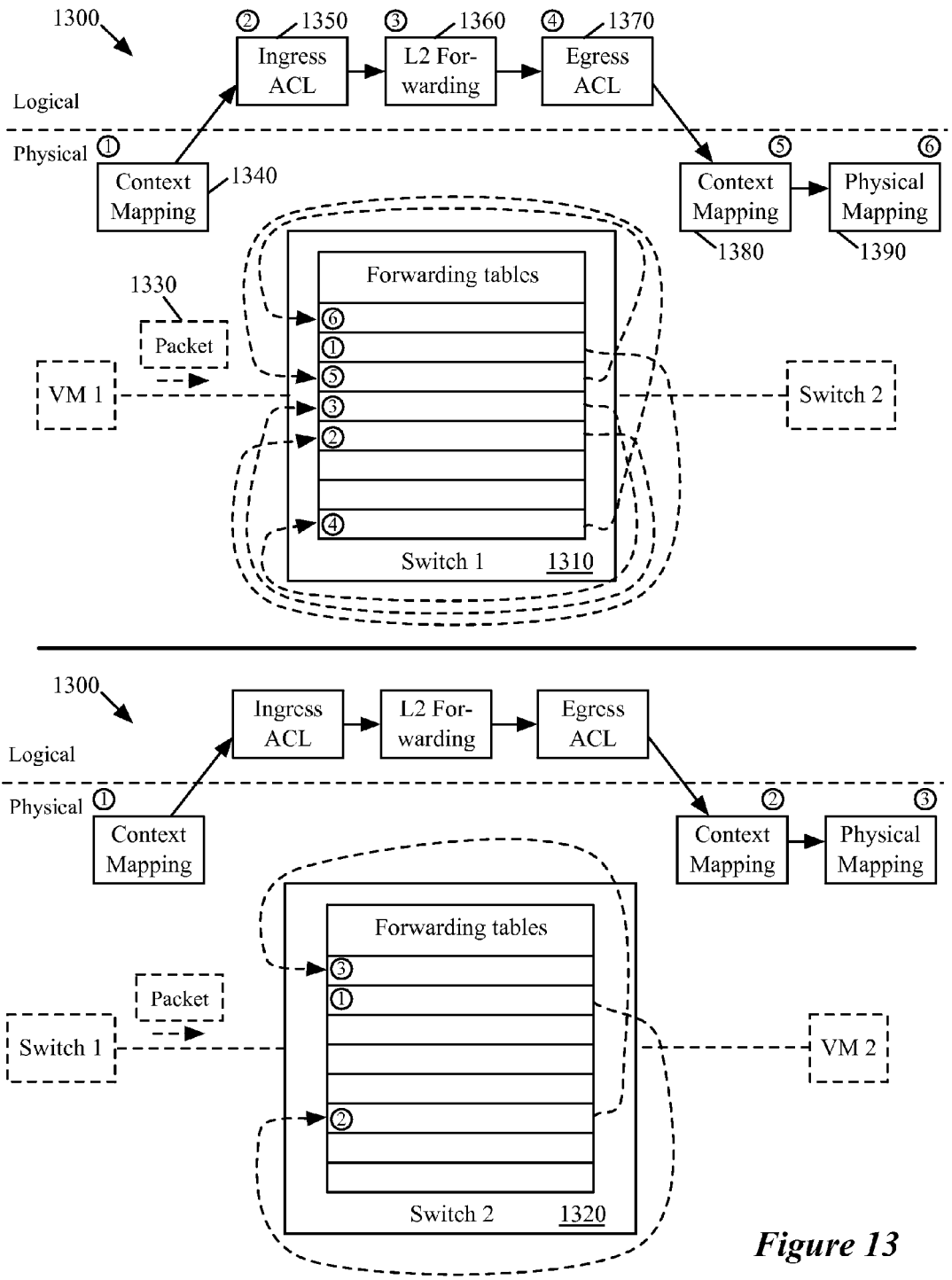
FIG. 13 conceptually illustrates distribution of logical processing across managed switching elements in a managed network according to some embodiments of the invention.

As mentioned above, some embodiments may distribute the processing of a processing pipeline across managed switching elements in a managed network. FIG. 13 conceptually illustrates distribution of logical processing across managed switching elements in a managed network according to some embodiments of the invention. In particular, FIG. 13 conceptually illustrates a processing pipeline 1300 distributed across two managed switching elements 1310 and 1320. The figure also conceptually illustrates forwarding tables in the managed switching elements 1310 and 1320 that are each implemented as a single table and implementing multiple forwarding tables (e.g., using a dispatch port, which is not shown) with the single table.

As illustrated in FIG. 13, VM 1 is coupled to the managed switching element 1310, the managed switching element 1310 is coupled to the managed switching element 1320, and the managed switching element 1320 is coupled to VM 2. In this example, the VM 1 sends a packet 1330 to VM 2 through a logical switching element that is implemented by the managed switching elements 1310 and 1320.

As shown in the top half of FIG. 13, the managed switching element 1310 includes a forwarding table that includes rules (e.g., flow entries) for processing and routing the packet 1330. When the managed switching element 1310 receives the packet 1330 from the VM 1 through a VIF (not shown) of the managed switching element 1310, the managed switching element 1310 begins processing the packet 1330 based on the forwarding tables of the managed switching element 1310. The managed switching element 1310 identifies a record indicated by an encircled 1 (referred to as "record 1") in the forwarding tables that implements the context mapping of the stage 1340. The record 1 identifies the packet 1330's logical context based on the inport, which is the VIF through which the packet 1330 is received from the VM 1. In addition, the record 1 specifies that the managed switching element 1310 store the logical context of the packet 1330 in a set of fields (e.g., a VLAN id field) of the packet 1330's header. The record 1 also specifies the packet 1330 be further processed by the forwarding tables (e.g., by sending the packet 1330 to a dispatch port).

Based on the logical context and/or other fields stored in the packet 1330's header, the managed switching element 1310 identifies a record indicated by an encircled 2 (referred to as "record 2") in the forwarding tables that implements the ingress ACL of the stage 1350. In this example, the record 2 allows the packet 1330 to be further processed and, thus, specifies the packet 1330 be further processed by the forwarding tables (e.g., by sending the packet 1330 to a dispatch port). In addition, the record 2 specifies that the managed switching element 1310 store the logical context (i.e., the packet 1330 has been processed by the second stage 1350 of the processing pipeline 1300) of the packet 1330 in the set of fields of the packet 1330's header.

Next, the managed switching element 1310 identifies, based on the logical context and/or other fields stored in the packet 1330's header, a record indicated by an encircled 3 (referred to as "record 3") in the forwarding tables that implements the logical L2 forwarding of the stage 1360. The record 3 identifies the logical port of the logical switching element, which is implemented by the managed switching elements 1310 and 1320, to which the packet 1330 is to be forwarded. The record 3 also specifies that the packet 1330 be further processed by the forwarding tables (e.g., by sending the packet 1330 to a dispatch port). Also, the record 3 specifies that the managed switching element 1310 store the logical context (i.e., the packet 1330 has been processed by the third stage 1360 of the processing pipeline 1300) in the set of fields of the packet 1330's header.

Based on the logical context and/or other fields stored in the packet 1330's header, the managed switching element 1310 identifies a record indicated by an encircled 4 (referred to as "record 4") in the forwarding tables that implements the egress ACL of the stage 1370. In this example, the record 4 allows the packet 1330 to be further processed and, thus, specifies the packet 1330 be further processed by the forwarding tables (e.g., by sending the packet 1330 to a dispatch port). In addition, the record 4 specifies that the managed switching element 1310 store the logical context (i.e., the packet 1330 has been processed by the fourth stage 1370 of the processing pipeline 1300) of the packet 1330 in the set of fields of the packet 1330's header.

In the fifth stage 1370 of the processing pipeline 1300, the managed switching element 1310 identifies, based on the logical context and/or other fields stored in the packet 1330's header, a record indicated by an encircled 5 (referred to as "record 5") in the forwarding tables that implements the context mapping of the stage 1380. In this example, the record 5 identifies the VIF (not shown) of the managed switching element 1320 to which the VM 2 is coupled as the port that corresponds to the logical port of the logical switching element to which the packet 1330 is to be forwarded. The record 5 additionally specifies that the packet 1330 be further processed by the forwarding tables (e.g., by sending the packet 1330 to a dispatch port).

Based on the logical context and/or other fields stored in the packet 1330's header, the managed switching element 1310 then identifies a record indicated by an encircled 6 (referred to as "record 6") in the forwarding tables that implements the physical mapping of the stage 1390. The record 6 specifies the port of the managed switching element 1310 through which the packet 1330 is to be sent in order for the packet 1330 to reach the VM 2. In this case, the managed switching element 1310 is to send the packet 1330 out of the port (not shown) of managed switching element 1310 that is coupled to the managed switching element 1320.

As shown in the bottom half of FIG. 13, the managed switching element 1320 includes a forwarding table that includes rules (e.g., flow entries) for processing and routing the packet 1330. When the managed switching element 1320 receives the packet 1330 from the managed switching element 1310, the managed switching element 1320 begins processing the packet 1330 based on the forwarding tables of the managed switching element 1320. The managed switching element 1320 identifies a record indicated by an encircled 1 (referred to as "record 1") in the forwarding tables that implements the context mapping of the stage 1340. The record 1 identifies the packet 1330's logical context based on the logical context that is stored in the packet 1330's header. The logical context specifies that the packet 1330 has been processed by the second fourth stages 1350 1370 of the processing pipeline 1300, which was performed by the managed switching element 1310. As such, the record 1 specifies that the packet 1330 be further processed by the forwarding tables (e.g., by sending the packet 1330 to a dispatch port).

Next, the managed switching element 1320 identifies, based on the logical context and/or other fields stored in the packet 1330's header, a record indicated by an encircled 2 (referred to as "record 2") in the forwarding tables that implements the context mapping of the stage 1380. In this example, the record 2 identifies the VIF (not shown) of the managed switching element 1320 to which the VM 2 is coupled as the port that corresponds to the logical port of the logical switching element (which was determined by the managed switching element 1310) to which the packet 1330 is to be forwarded. The record 2 additionally specifies that the packet 1330 be further processed by the forwarding tables (e.g., by sending the packet 1330 to a dispatch port).

Based on the logical context and/or other fields stored in the packet 1330's header, the managed switching element 1320 identifies a record indicated by an encircled 3 (referred to as "record 3") in the forwarding tables that implements the physical mapping of the stage 1390. The record 3 specifies the port of the managed switching element 1320 through which the packet 1330 is to be sent in order for the packet 1330 to reach the VM 2. In this case, the managed switching element 1320 is to send the packet 1330 out of the VIF (not shown) of managed switching element 1320 that is coupled to the VM 2.

Figure 14:
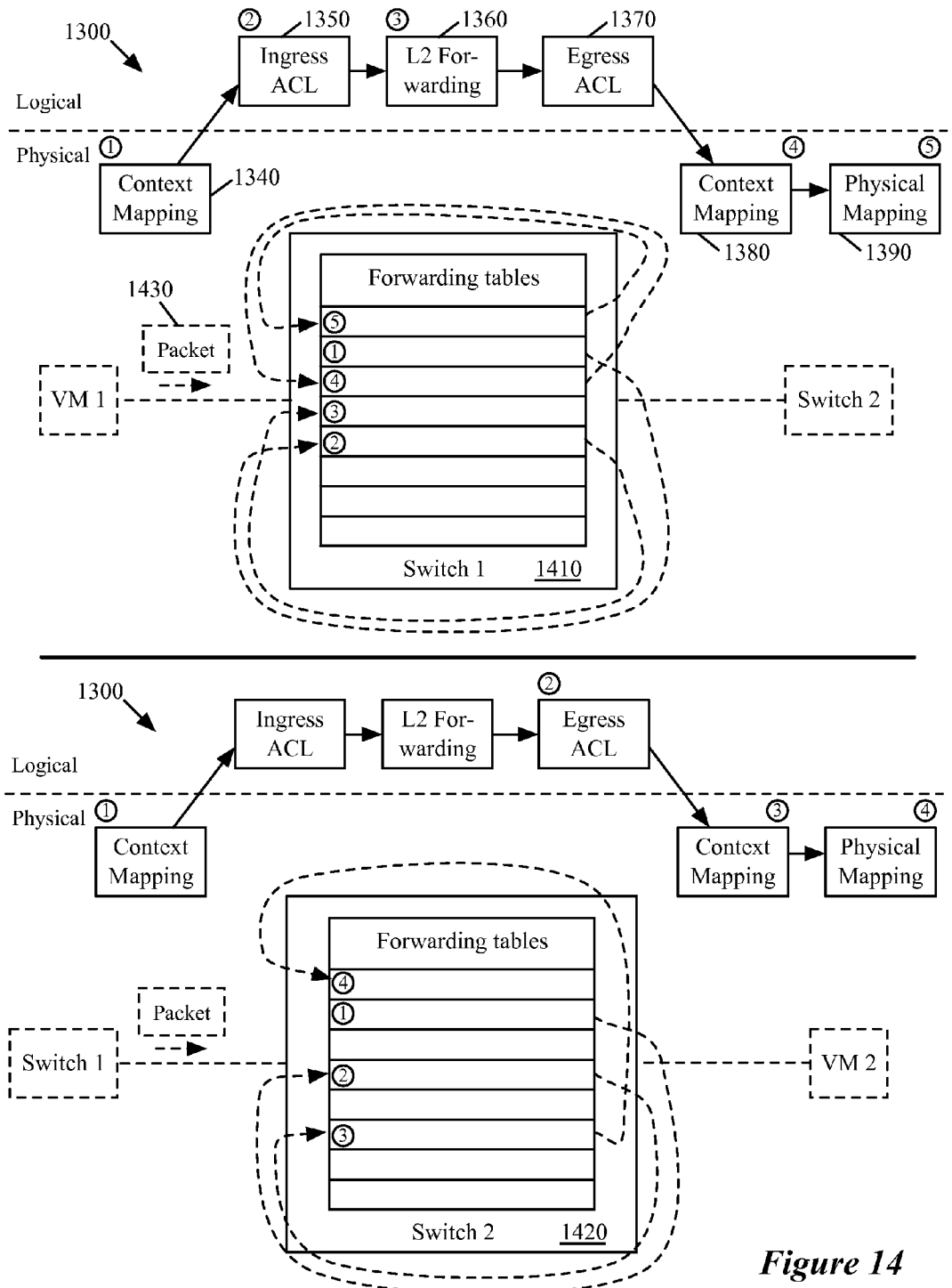
FIG. 14 conceptually illustrates the distribution of logical processing across managed switching elements in a managed network according to some embodiments of the invention.

The above description of FIG. 13 illustrates a managed switching element in a managed network that performs an entire logical processing of a processing pipeline of some embodiments. However, some embodiments may distribute the logical processing of a processing pipeline across several managed switching element in a managed network. The following figure conceptually illustrates an example of such an embodiment. FIG. 14 conceptually illustrates the distribution of logical processing across managed switching elements in a managed network according to some embodiments of the invention. Specifically, FIG. 14 conceptually illustrates the processing pipeline 1300 distributed across the two managed switching elements 1310 and 1320.

FIG. 13 is similar to FIG. 13 except FIG. 14 conceptually illustrates that the managed switching element 1310 performs only a portion of the logical processing of the processing pipeline 1300 and the managed switching element 1320 performs the remaining portion of the logical processing of the processing pipeline 1300. As shown in the top half of FIG. 14, the managed switching element 1310 performs the context mapping of the stage 1340, the ingress ACL of the stage 1350, the logical L2 forwarding of the stage 1360, the context mapping of the stage 1380, and the physical mapping of the stage 1390. The managed switching element 1310 does not perform the egress ACL of the stage 1370, which is one of the stages of the logical processing of the processing pipeline 1300. Accordingly, when the managed switching element 1320 sends the packet 1330 to the managed switching element 1320 (at the stage 1390), the logical context stored in the packet 1330's header specifies that the packet 1330 has been processed by the third stage 1360 of the processing pipeline 1300).

As illustrated in the bottom half of FIG. 14, when the managed switching element 1320 receives the packet 1330 from the managed switching element 1310, the managed switching element 1320 begins processing the packet 1330 based on the forwarding tables of the managed switching element 1320. The managed switching element 1320 identifies a record indicated by an encircled 1 (referred to as "record 1") in the forwarding tables that implements the context mapping of the stage 1340. The record 1 identifies the packet 1330's logical context based on the logical context that is stored in the packet 1330's header. The logical context specifies that the packet 1330 has been processed by the second and third stages 1350 and 1360 of the processing pipeline 1300, which was performed by the managed switching element 1310. As such, the record 1 specifies that the packet 1330 be further processed by the forwarding tables (e.g., by sending the packet 1330 to a dispatch port).

Based on the logical context and/or other fields stored in the packet 1330's header, the managed switching element 1320 identifies a record indicated by an encircled 2 (referred to as "record 2") in the forwarding tables that implements the egress ACL of the stage 1370. In this example, the record 2 allows the packet 1330 to be further processed and, thus, specifies the packet 1330 be further processed by the forwarding tables (e.g., by sending the packet 1330 to a dispatch port). In addition, the record 2 specifies that the managed switching element 1320 store the logical context (i.e., the packet 1330 has been processed by the fourth stage 1370 of the processing pipeline 1300) of the packet 1330 in the set of fields of the packet 1330's header.

Finally, the managed switching element 1310 performs the context mapping of the stage 1380 and the physical mapping of the stage 1390 is a similar manner was that described above by reference to FIG. 13.

While FIGS. 13 and 14 show examples of distributing logical processing across managed switching elements in a managed network, in some instance, some or all of the logical processing may need to be processed again. For instance, in some embodiments, a root node does not preserve the logical context of a packet. Thus, when a pool node receives a packet from the root node of such embodiments, the pool node may have to perform the logical processing of the processing pipeline due to the lack of a logical context in the packet.

In the examples described above, the NGE header is embedded with logical context data. As mentioned above, the logical context that is stored in the packets can specify rich information about the network ID (the context identifier) and about the logical processing pipeline (e.g., data specifying the stage of the logical processing pipeline). Some embodiments, however, propose a richer logical context that allows earlier managed forwarding elements to store in the logical context data that they extrapolate or that they produce. Subsequent managed forwarding elements can then use this data to process more quickly and efficiently the packets that they receive. For example, a logical switch that receives a packet form a virtual machine (VM), can augment the packet with a user ID so that a subsequent hop (e.g., a firewall) can have this data and use this data to process the packet (e.g., to drop the packet). The next hop can trust this information because it came from the previous logical source, which is trusted. Examples of data that can be stored in the richer context include: authentication information (e.g., username and password), user IDs, user credentials, annotations from middlebox services (upper level protocol info (Session Initiation Protocol (SIP) session, Application gateway type of info, etc.)), specifically injected data (e.g., out of band injected from hypervisor), or any other analysis or extrapolated data.

In some embodiments, the expanded scope of the logical context helps propagate portions of context across logical networks. With this expanded scope, some embodiments build richer topologies in the logical networks by propagating some of the logical context from one logical network to another one. This can be accomplished by either extending information carried on the wire directly or having pointers in some other managed state that is shared in a shared table. In other embodiments, the expanded scope of the logical context helps propagate portion of context across different domains within a logical network (e.g., to enable different access rights between doctors and nurses in a hospital).

Figure 15:
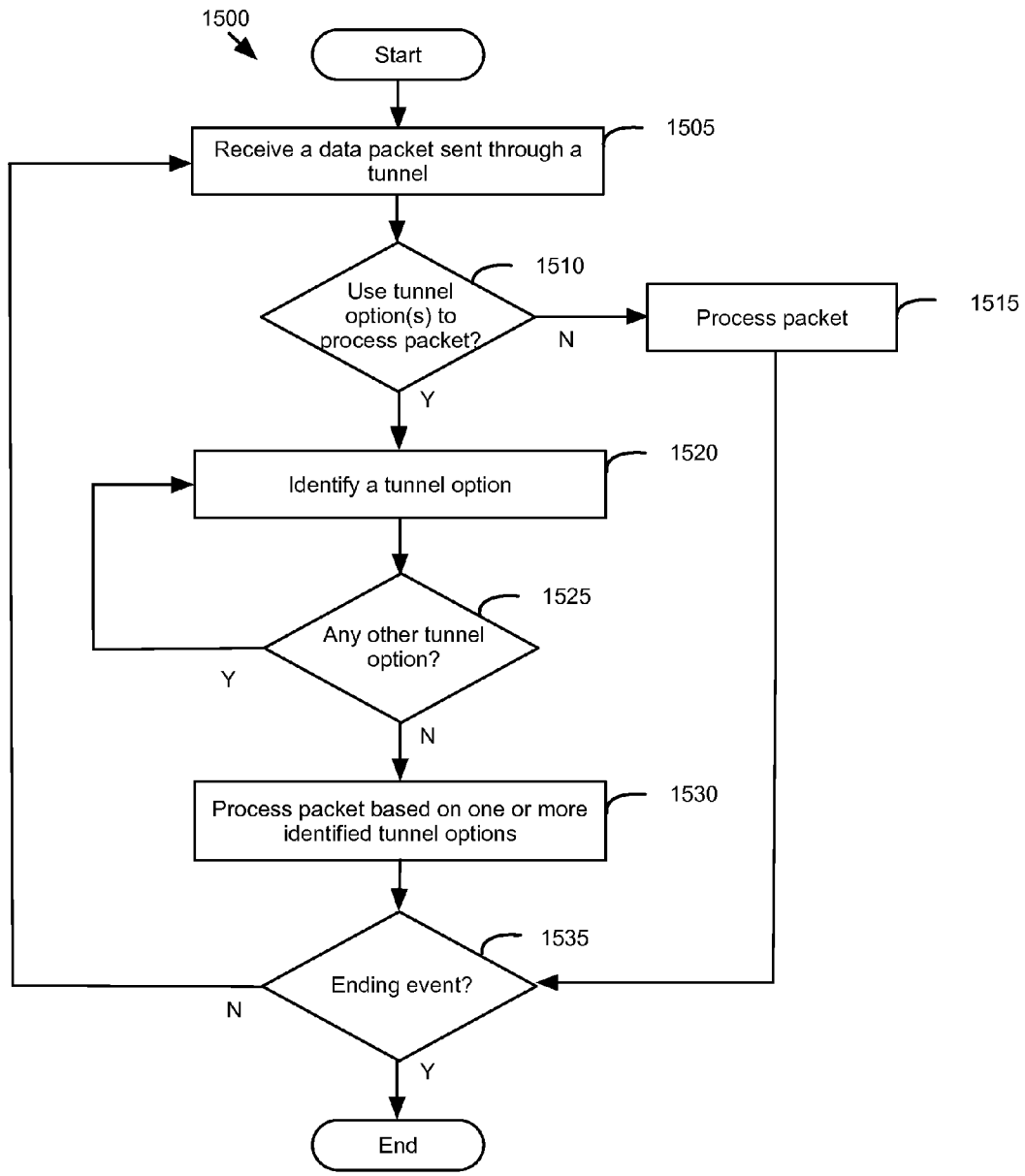
FIG. 15 conceptually illustrates a process that some embodiments perform to process a data packet with one or more NGE tunnel options.

Having described some example uses, an example process will now be described. FIG. 15 conceptually illustrates a process 1500 that some embodiments perform to process a data packet with one or more NGE tunnel options. In some embodiments, the process 1500 is performed a forwarding element (e.g., logical switches, logical routers, etc.) or a middlebox (e.g., firewalls, load balancers, network address translators, intrusion detection systems (IDS), wide area network (WAN) optimizers, etc.).

As shown in FIG. 15, the process 1500 start when it receives (at 1505) a data packet to send through a tunnel. The process 1500 determines (at 1510) whether to use one or more tunnel options embedded in the packet's NGE header. If so, the process 1500 identifies (at 1520) the tunnel option. Otherwise, the process 1500 processes (at 1515) the packet.

At 1525, the process 1500 determines whether there are any other tunnel options to use. If so, the process returns to 1520, which is described above. Otherwise, the process 1500 processes (at 1530) the packet based on one or more of the identified tunnel options. For example, based on a username and a password specified in a tunnel option, the process 1500 might drop the packet. As another example, the process 1500 might perform a particular stage of the logical processing pipeline based on the tunnel option's context information.

At 1535, the process 1500 determines whether there has been an ending event. Some examples of ending events include turning off the forwarding element or middlebox. When there is an ending event, the process 1500 ends. Otherwise, the process 1500 returns to 1505, which is described above.

Some embodiments perform variations on the process 1500. The specific operations of the process 1500 may not be performed in the exact order shown and described. The specific operations may not be performed in one continuous series of operations, and different specific operations may be performed in different embodiments.

IX. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
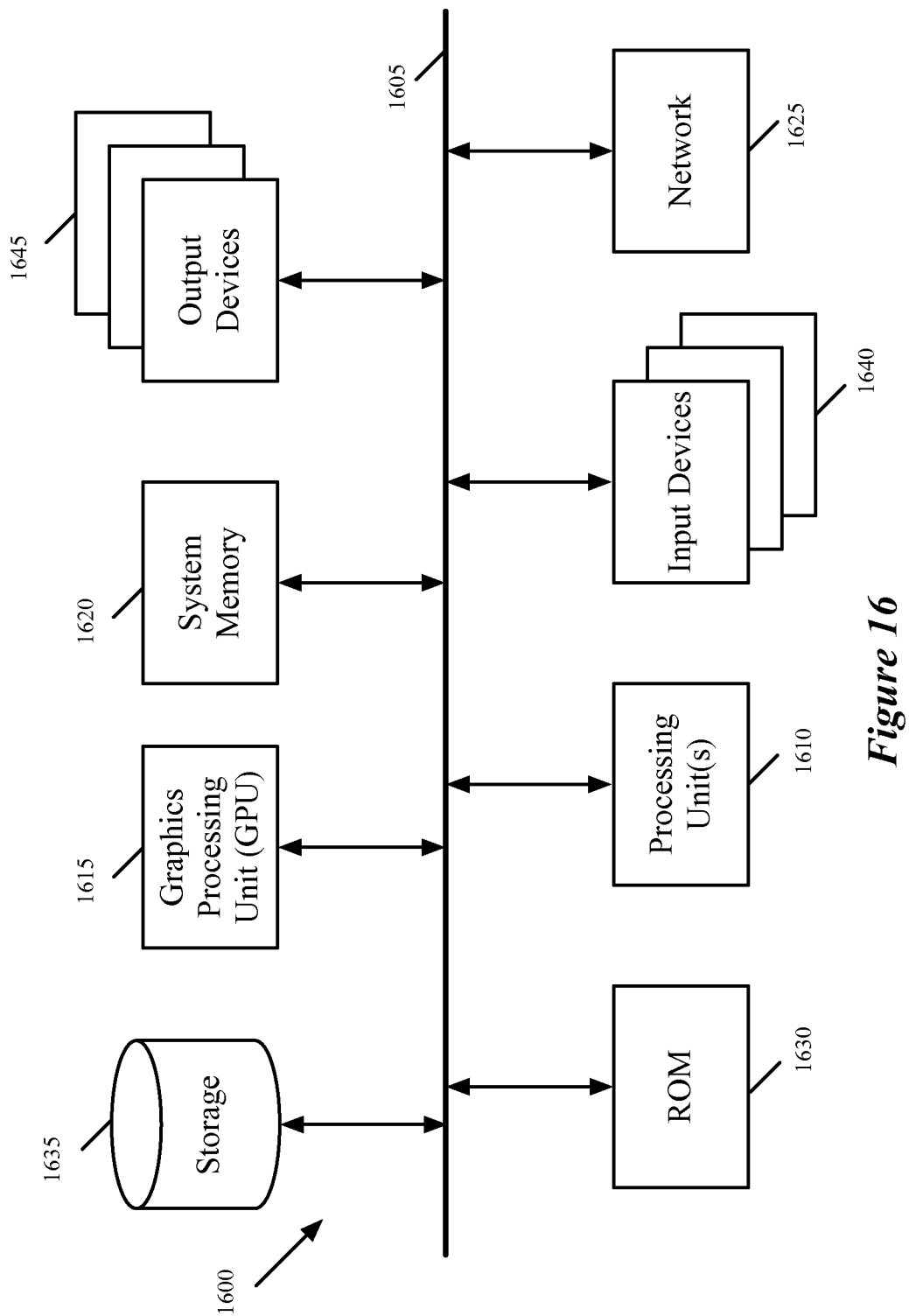
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1625 is a read-and-write memory device. However, unlike storage device 1635, the system memory 1625 is a volatile read-and-write memory, such a random access memory. The system memory 1625 stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. For a first forwarding element, a method for processing packets using an adaptive tunnel protocol, the method comprising:
    using a particular tunnel protocol to encapsulate a first packet with a first logical context tag header;
    using the particular tunnel protocol to encapsulate a second packet with a second logical context tag header, the first logical context tag header having a different length than the second logical context tag header; and
    forwarding the first packet to a second forwarding element and the second packet to a third forwarding element.

2. The method of claim 1 further comprising using the particular tunnel protocol to encapsulate each of the first and second packets with a base header that includes a virtual network identifier (VNI).

3. The method of claim 2, wherein the base headers of the first and second packets have a same size and further comprise at least one of a version number field that identifies a version number of the tunnel protocol, a length field that identifies the length of one or more logical context tags, a critical option field that identifies whether a set of critical options is associated with the one or more logical context tags, and an Operations, Administration, and Management (OAM) frame.

4. The method of claim 1, wherein at least one of the first, second, and third forwarding elements comprises a managed forwarding element that operates on a host machine and implements a set of logical forwarding elements of one or more logical networks.

5. The method of claim 1 further comprising using the particular tunnel protocol to encapsulate each of the first and second packets with an additional header that has a same size in both of the first and second packets.

6. The method of claim 1, wherein a logical context tag comprises at least one of (i) a type field that identifies the format of the first logical context tag, (ii) a length field that identifies the length of the first logical context tag, (iii) a critical option field for dropping the packet if any of the first and second forwarding elements does not recognize the logical context tag, and (iv) a set of option control flags for processing the logical context tag.

7. The method of claim 1, wherein a logical context tag of the first logical context tag header has a different size than a logical context tag of the second logical context tag header.

8. The method of claim 1, wherein each logical context tag is specified in a Type-Length-Value format.

9. A non-transitory machine readable medium storing a program that when executed by at least one processing unit processes data packets sent from a first forwarding element using an adaptive tunnel protocol, the program comprising sets of instructions for:
    using a particular tunnel protocol to encapsulate a first packet with a first logical context tag header;
    using the particular tunnel protocol to encapsulate a second packet with a second logical context tag header, the first logical context tag header having a different length than the second logical context tag header; and
    forwarding the first packet to a second forwarding element and the second packet to a third forwarding element.

10. The non-transitory machine readable of claim 9, wherein the set of instructions for using the tunnel protocol to encapsulate the first and second packets further comprises a set of instructions for adding to each of the first and second packets a base header that includes a virtual network identifier (VNI).

11. The non-transitory machine readable of claim 10, wherein the base headers of the first and second packets have a same size and further comprise at least one of a version number field that identifies a version number of the tunnel protocol, a length field that identifies the length of one or more logical context tags, a critical option field that identifies whether a set of critical options is associated with the one or more logical context tags, and an Operations, Administration, and Management (OAM) frame.

12. The non-transitory machine readable of claim 9, wherein a logical context tag in each of the first and second logical context tag headers comprises a type field that identifies the format of the first logical context tag, a length field that identifies the length of the logical context tag, a critical option field for dropping the packet if an of the first and second forwarding elements does not recognize the logical context tag, and a set of option control flags for processing the logical context tag.

13. A non-transitory machine readable medium storing a program that when executed by at least one processing unit processes data packets using an adaptive tunnel protocol, the program comprising sets of instructions for:
    receiving a first plurality of packets from a first end machine to be forwarded to a second end machine via a first forwarding element;
    for each packet in the first plurality of packets, using the adaptive tunnel protocol to encapsulate the packet with a first logical context tag header having a first length and sending the packet to the first forwarding element;
    receiving a second plurality of packets from a third end machine to be forwarded to a fourth end machine via a second forwarding element; and
    for each packet in the second plurality of packets, using the adaptive tunnel protocol to encapsulate the packet with a second logical context tag header having a second length, different from the first length, and sending the packet to the second forwarding element.

14. The non-transitory machine readable of claim 13, wherein the adaptive tunnel protocol further specifies a base header that includes a virtual network identifier (VNI).

15. The non-transitory machine readable of claim 13, wherein each of the first, second, and third forwarding elements comprises a managed forwarding element that implements a set of logical forwarding elements, wherein the first and second end machines are logically connected by a first logical forwarding element in the set of logical forwarding elements, while the third and fourth end machines are logically connected by a second logical forwarding element in the set of logical forwarding elements.

\* \* \* \* \*